(12) United States Patent
Brown

(10) Patent No.: US 10,212,023 B2
(45) Date of Patent: Feb. 19, 2019

(54) METHODS AND SYSTEMS TO IDENTIFY AND RESPOND TO LOW-PRIORITY EVENT MESSAGES

(71) Applicant: VMware, Inc., Palo Alto, CA (US)

(72) Inventor: Darren Brown, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 315 days.

(21) Appl. No.: 15/286,337

(22) Filed: Oct. 5, 2016

(65) Prior Publication Data

US 2018/0097687 A1    Apr. 5, 2018

(51) Int. Cl.
  *G06F 15/173*  (2006.01)
  *H04L 12/24*   (2006.01)
  *H04L 29/08*   (2006.01)

(52) U.S. Cl.
  CPC ........ *H04L 41/0609* (2013.01); *H04L 41/069* (2013.01); *H04L 67/1097* (2013.01); *H04L 67/36* (2013.01); *H04L 41/22* (2013.01); *H04L 67/10* (2013.01)

(58) Field of Classification Search
  USPC ....... 709/203, 206, 217, 219, 223, 224, 226, 709/228, 230, 232, 240; 707/740, 809; 719/318, 328; 726/13; 340/540
  See application file for complete search history.

(56) References Cited

U.S. PATENT DOCUMENTS

| | | | | |
|---|---|---|---|---|
| 2003/0023774 | A1* | 1/2003 | Gladstone | G06F 9/468 719/328 |
| 2004/0215821 | A1* | 10/2004 | Regan | H04L 45/00 709/240 |
| 2008/0133812 | A1* | 6/2008 | Kaiser | G06F 9/542 719/318 |
| 2010/0257598 | A1* | 10/2010 | Demopoulos | G06F 21/552 726/13 |
| 2011/0119317 | A1* | 5/2011 | Kazoun | G06F 17/30569 707/809 |
| 2012/0126976 | A1* | 5/2012 | Bugenhagen | G08B 25/08 340/540 |
| 2015/0370884 | A1* | 12/2015 | Hurley | G06Q 10/109 707/740 |
| 2015/0372855 | A1* | 12/2015 | Kushmerick | H04L 41/0613 709/224 |
| 2016/0021171 | A1* | 1/2016 | Zourzouvillys | H04L 67/10 709/207 |
| 2016/0294614 | A1* | 10/2016 | Searle | G06F 8/654 |

\* cited by examiner

*Primary Examiner* — Quang N Nguyen

(57) ABSTRACT

Methods and systems to identify and respond to low-priority event messages are described. Methods identify types of event messages recorded in event-log files as low-priority event messages. Methods enable an information technology ("IT") administrator, or other user, to determine which low-priority event messages may be deleted, how the low-priority event messages may be sampled for storage, or how long the low-priority event messages may be stored in a data-storage device.

21 Claims, 32 Drawing Sheets

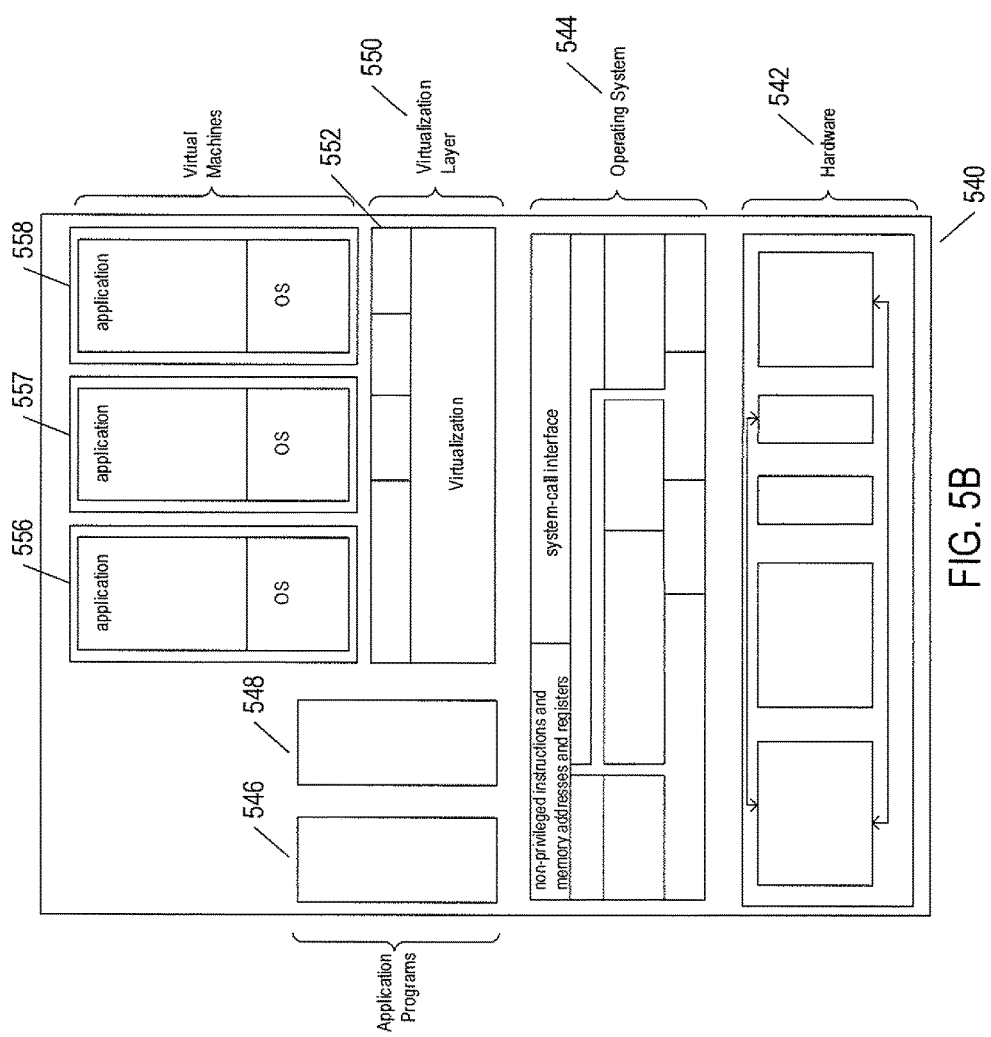

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 13

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 14

| Count | Event types | LP message |
|---|---|---|
| 10.5K | 2013-12-02T10:44:24.095Z li-qe-esx5.vmware.com Rhttpproxy: [28959B90 verbose 'Proxy Req 46691'] Connected to localhost:8307  debug | ● |
| 8K | 2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155)  debug | ● |
| 6K | 2013-12-02T10:44:24.093Z li-qe-esx5.vmware.com Rhttpproxy: [2889B90 verbose 'Proxy Req 46685'] The client closed the stream, not unexpectedly.  debug | ○ |
| 5.8K | Dec 2 18:48:29 strata-vc 2013-12-02T18:48:30.273Z [7FA39448B700 info 'commonvpxLro' opID=1947d6f9] [VpxLRO] -- FINISH task-internal-2163522 -- -- vim.SessionManager.logout  debug | ○ |
| 3.2K | 2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback  debug | ○ |

| Count | Event types | LP message | Event type retention time |
|---|---|---|---|
| 10.5K | 2013-12-02T10:44:24.095Z li-qe-esx5.vmware.com Rhttpproxy: [28959B90 verbose 'Proxy Req 46691'] Connected to localhost:8307     <u>debug</u> | ● | 7 days |
| 8K | 2013-12-02T10:44:24.094Z li-qe-esx5.vmware.com Rhttpproxy: [FFFFC2B90 verbose 'Proxy Req 46691'] new proxy client TCP (local=127.0.0.1:80, peer=127.0.0.1:50155)   <u>debug</u> | ● | 2 days |
| 6K | 2013-12-02T10:44:24.093Z li-qe-esx5.vmware.com Rhttpproxy: [2889B90 verbose 'Proxy Req 46685'] The client closed the stream, not unexpectedly.     <u>debug</u> | ○ | 2 days |
| 5.8K | Dec 2 18:48:29 strata-vc 2013-12-02T18:48:30.273Z [7FA39448B700 info 'commonvpxLro' opID=1947d6f9] [VpxLRO] -- FINISH task-internal-2163522 -- -- vim.SessionManager.logout    <u>debug</u> | ○ | 2 days |
| 3.2K | 2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback     <u>debug</u> | ○ | 2 days |

$T_{stamp}$ [########] [########/####.########]
[########] [########/####.########] ###.########.########

FIG. 22

| Low-priority event types | LP message | % of ETs to store | event type retention time |
|---|---|---|---|
| 2013-12-02T10:44:24.095Z li-qe-esx5.vmware.com Rhttpproxy: [28959B90 verbose 'Proxy Req 46691'] Connected to localhost:8307 | ● | 50% | 5 days |
| 2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155) | ● | 45% | 5 days |
| 2013-12-02T10:44:24.093Z li-qe-esx5.vmware.com Rhttpproxy: [2889B90 verbose 'Proxy Req 46685'] The client closed the stream, not unexpectedly. | ● | 30% | 2 days |
| Dec  2 18:48:29 strata-vc 2013-12-02T18:48:30.273Z [7FA39448B700 info 'commonvpxLro' opID=1947d6f9] [VpxLRO] -- FINISH task-internal-2163522 -- -- vim.SessionManager.logout | ● | 0% | 0 days |
| 2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback | ● | 0% | 0 days |

METHODS AND SYSTEMS TO IDENTIFY AND RESPOND TO LOW-PRIORITY EVENT MESSAGES

TECHNICAL FIELD

The present disclosure is directed to identifying which event messages are of low priority for storing in event-log files, and in particular, identify low-priority event messages and determining which low-priority event are to be storage in event-log files.

BACKGROUND

During the past seven decades, electronic computing has evolved from primitive, vacuum-tube-based computer systems, initially developed during the 1940s, to modern electronic computing systems in which large numbers of multiprocessor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The went messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. The information contained in event messages may also be superfluous, which translates into large amounts of storage capacity dedicated to storing superfluous event messages. It is a challenging task for system administrators, system designers and developers, and system users to identify relevant event messages that may be used to detect and diagnose operational anomalies and useful in administering, managing, and maintaining distributed computer systems from superfluous event messages that simply take up valuable storage capacity.

SUMMARY

Methods and systems to identify and respond to low-priority event messages are described. Methods identify types of event messages recorded in event-log files as low-priority event messages. Methods enable an information technology ("IT") administrator, or other user, to determine which low-priority event messages may be deleted, how the low-priority event messages may be sampled for storage, or how long the low-priority event messages may be stored in a data-storage device. Methods also identify event types as candidates for low priority status.

DESCRIPTION OF THE DRAWINGS

FIGS. 5A-5B show two types of virtual machine and virtual-machine execution environments.

FIG. 13 shows an example of a log write instruction.

FIG. 14 shows an example of an event message created by the log write instruction of FIG. 13.

FIG. 21 shows a GUI that enables a user to selectively store low-priority event messages for different periods of time before the low-priority event messages are deleted.

FIG. 22 shows a general form of an example event message.

FIG. 25 shows a GUI that enables a user to displays a list of low-priority event types and change how low-priority event types are treated.

DETAILED DESCRIPTION

Figure 1:
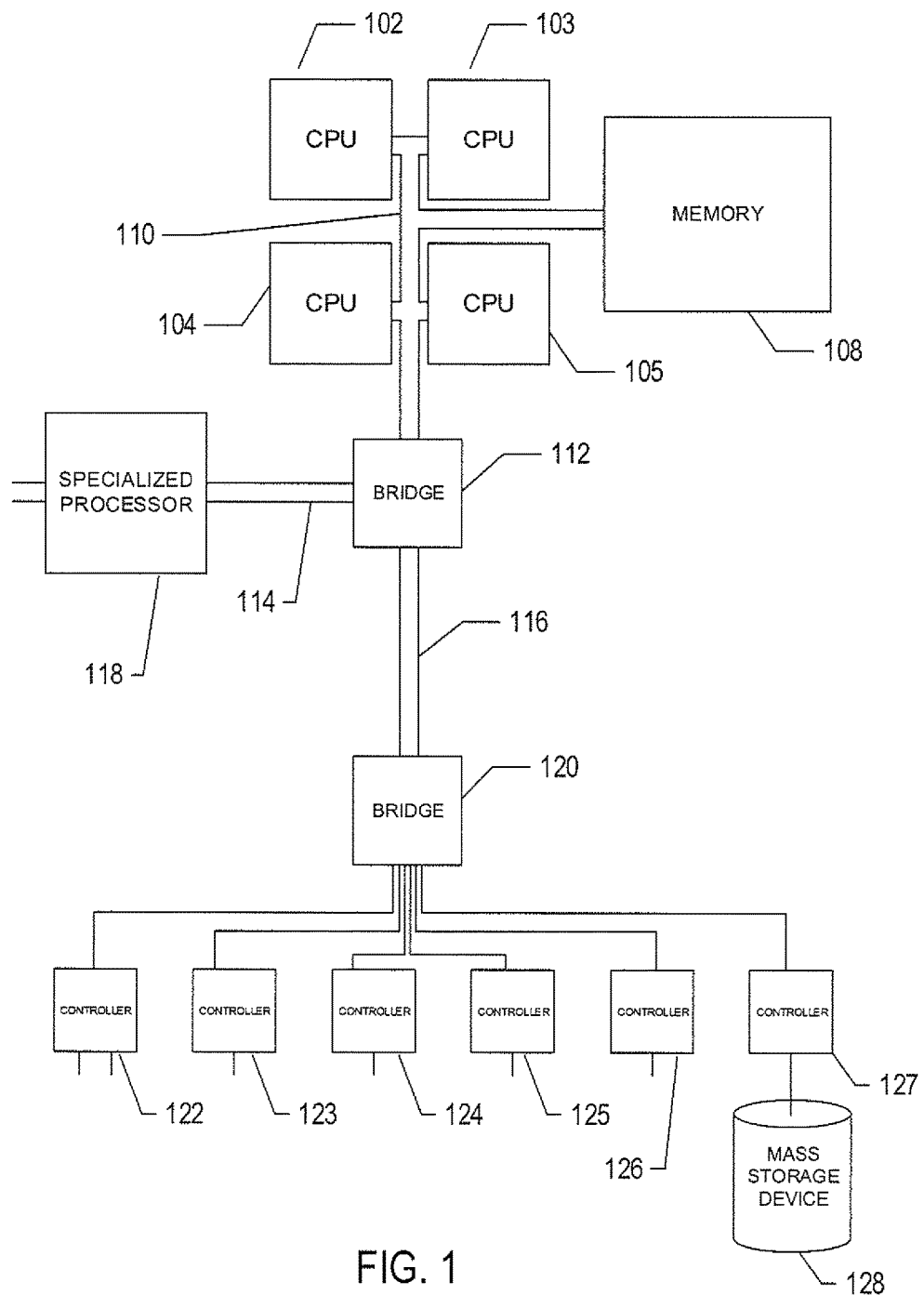
FIG. 1 shows a general architectural diagram for various types of computers.

This disclosure presents computational methods and systems to identify and respond to low-priority event message. In a first subsection, computer hardware, complex computational systems, and virtualization are described. Methods and systems to identify and respond to low-priority event message are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modem science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
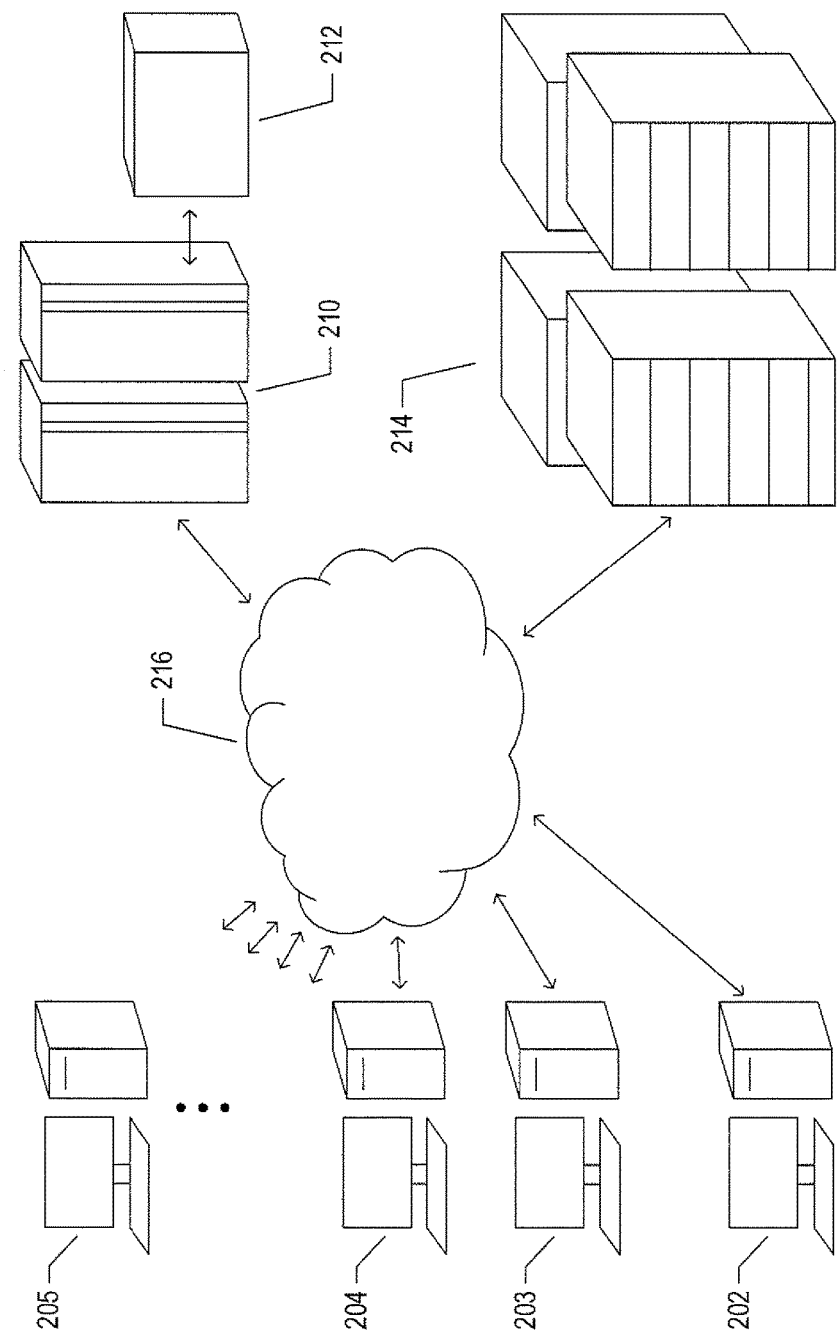
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
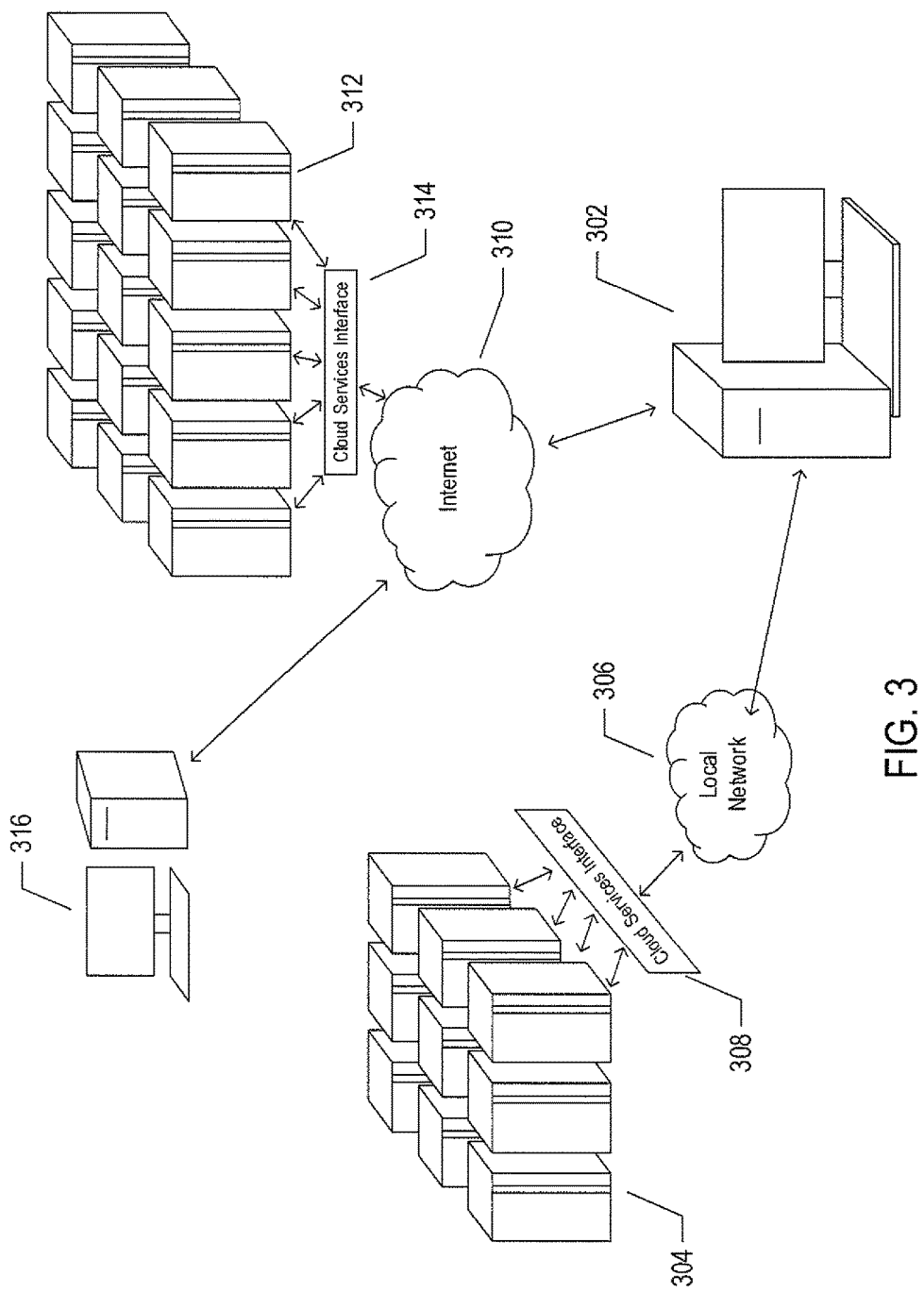
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
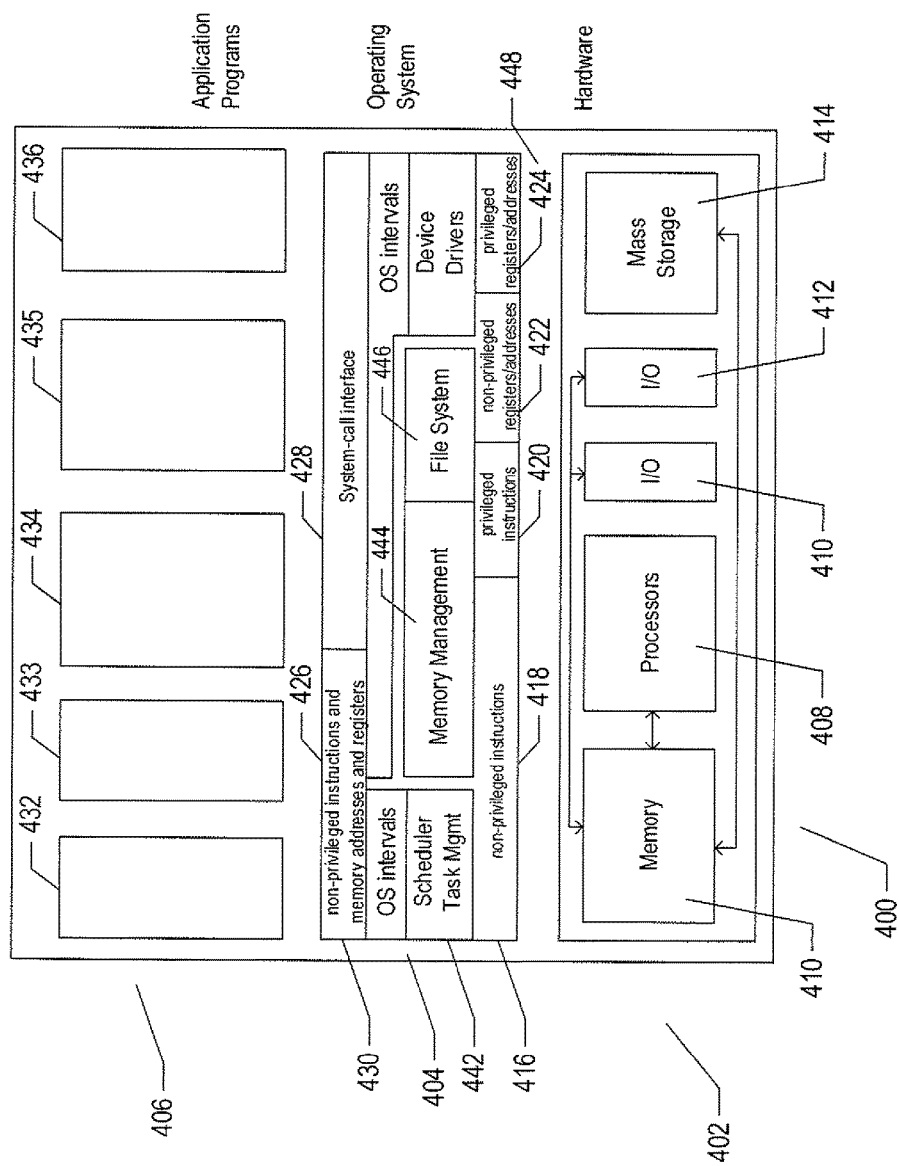
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modem operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
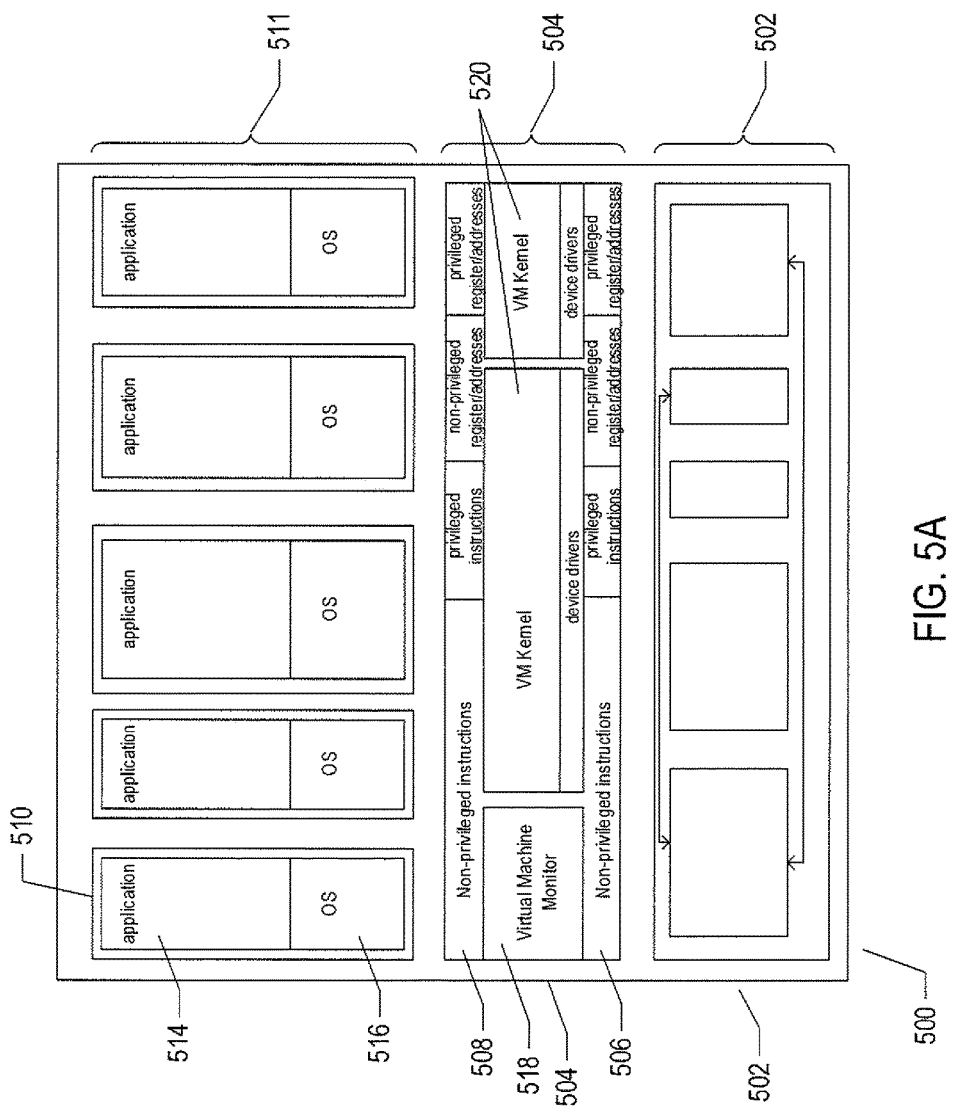

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
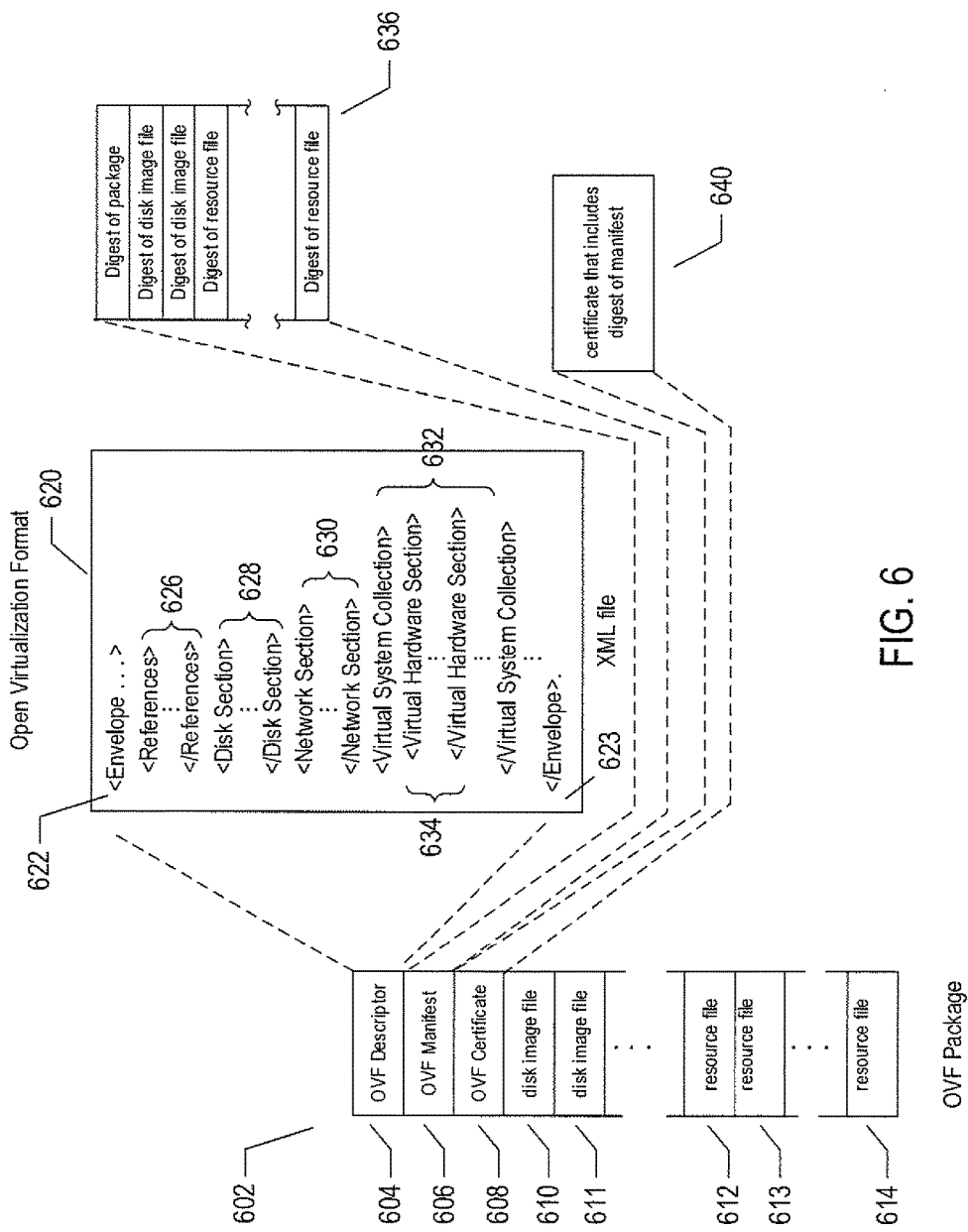
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
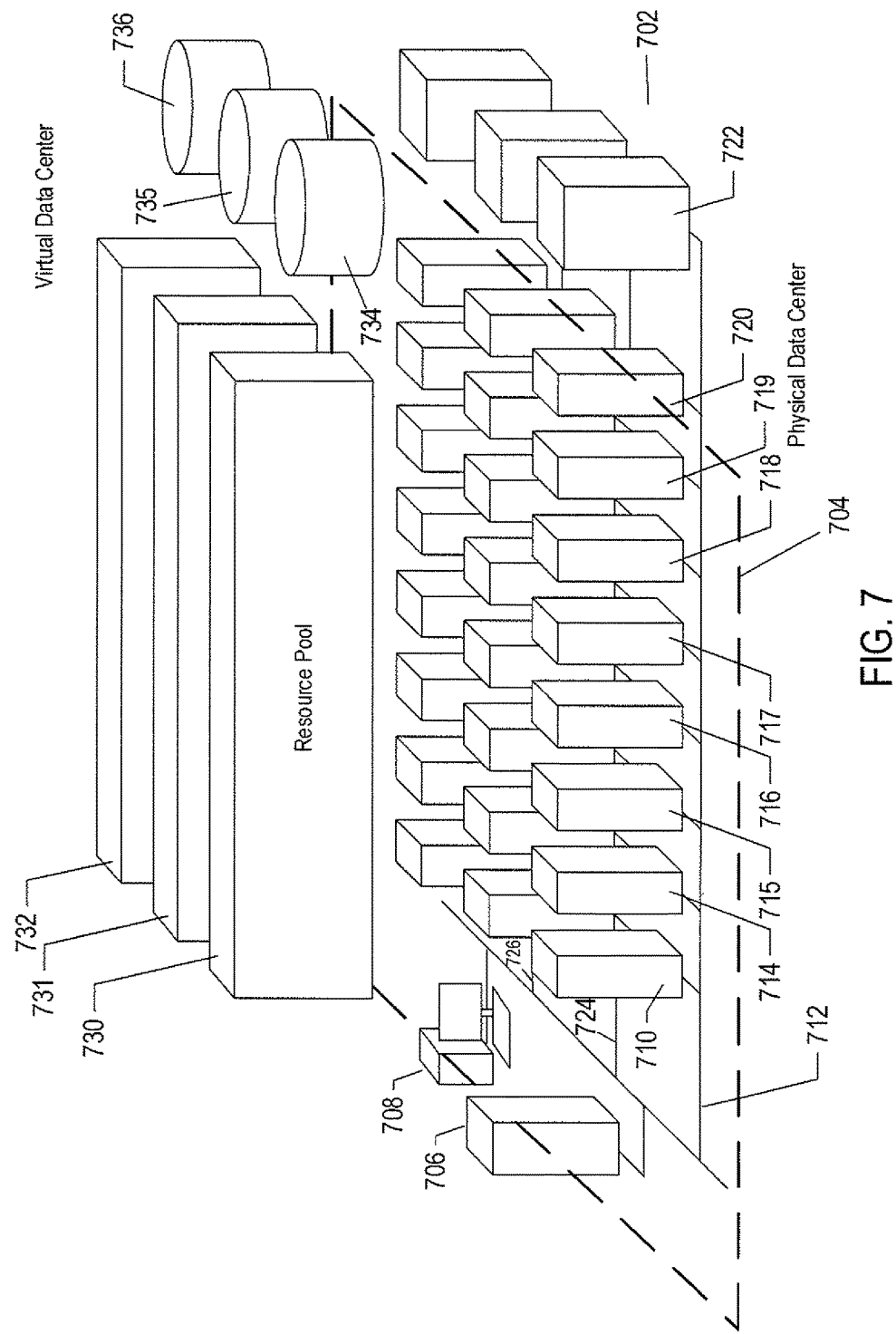
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
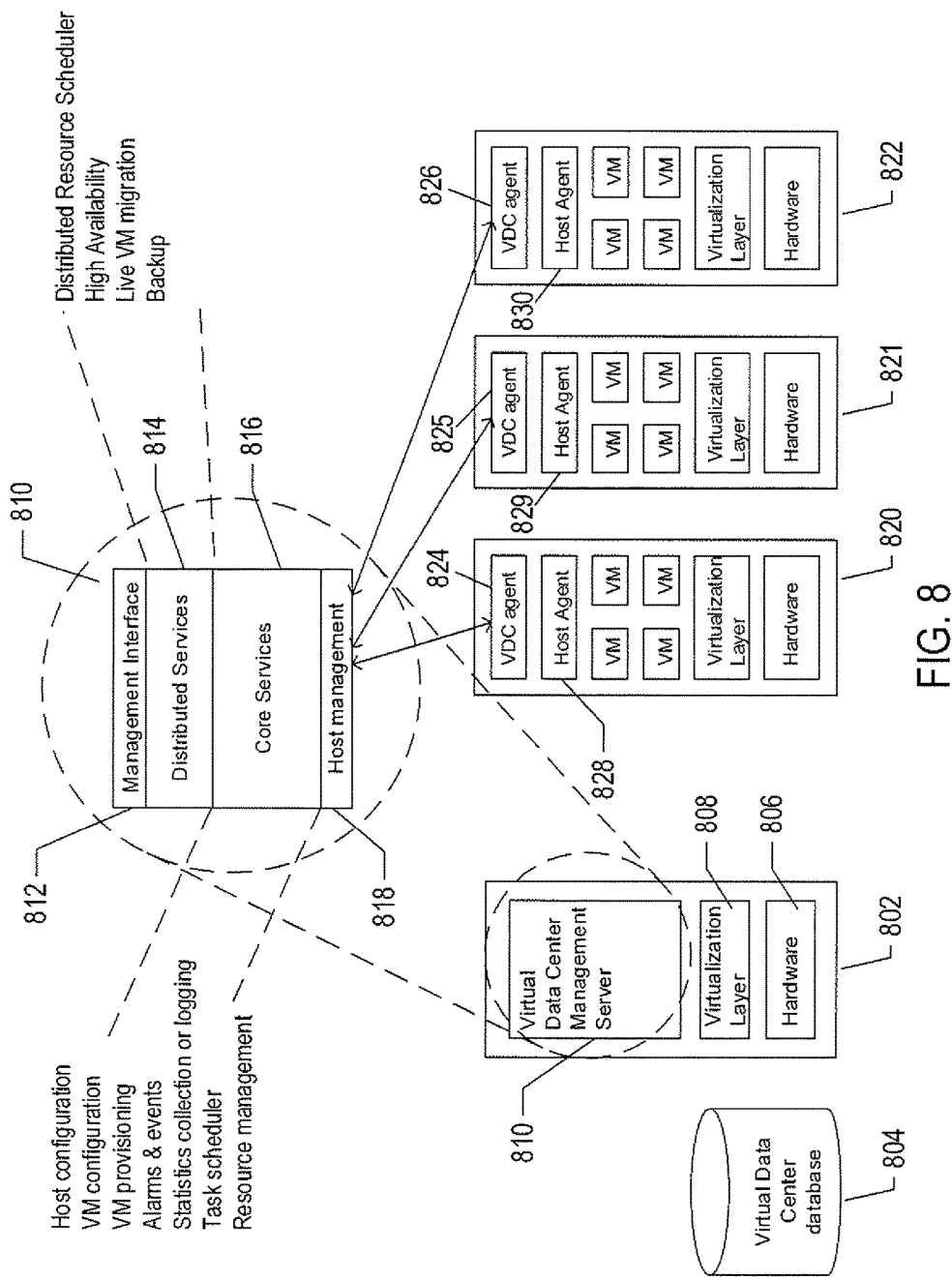
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
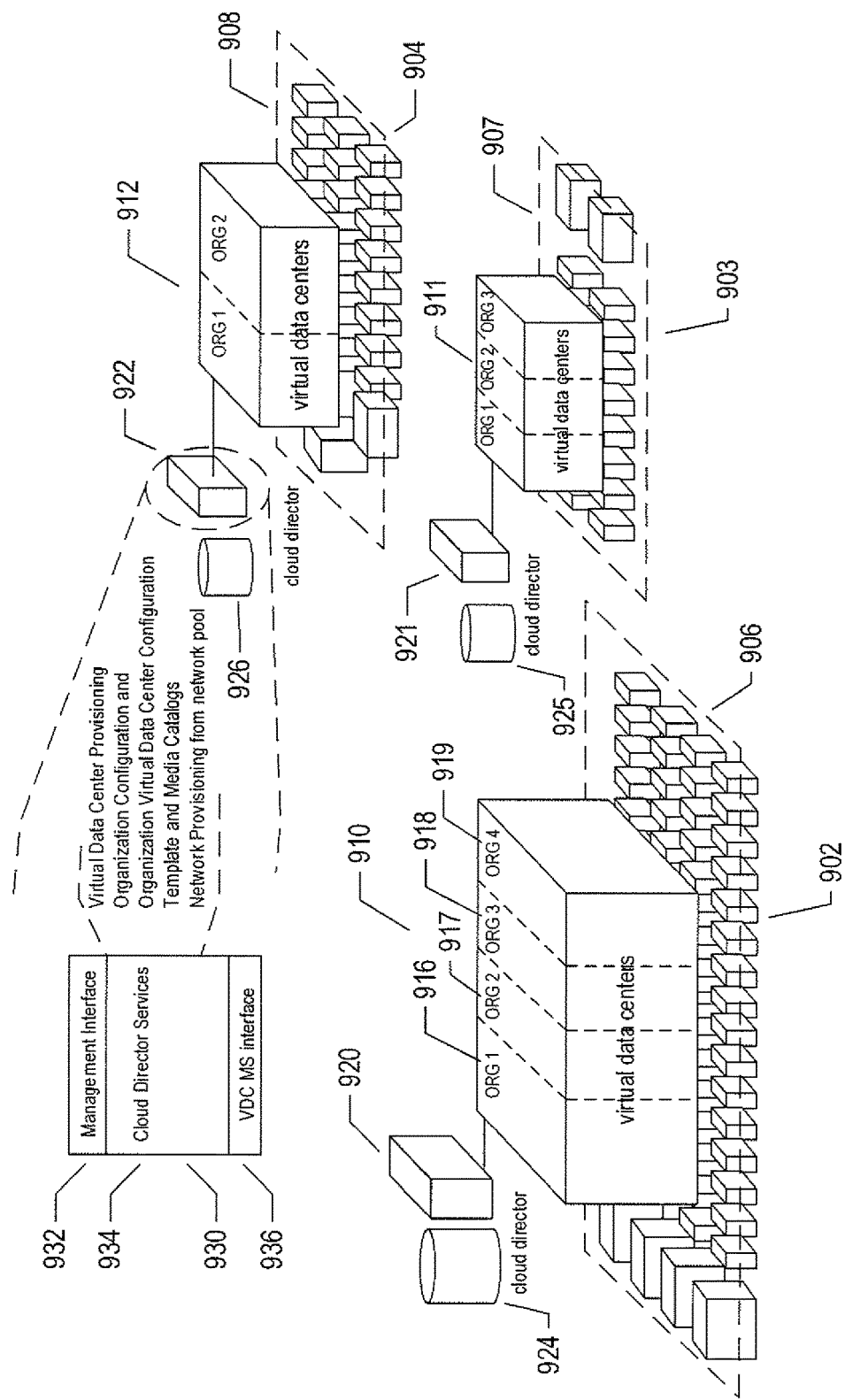
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These Catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
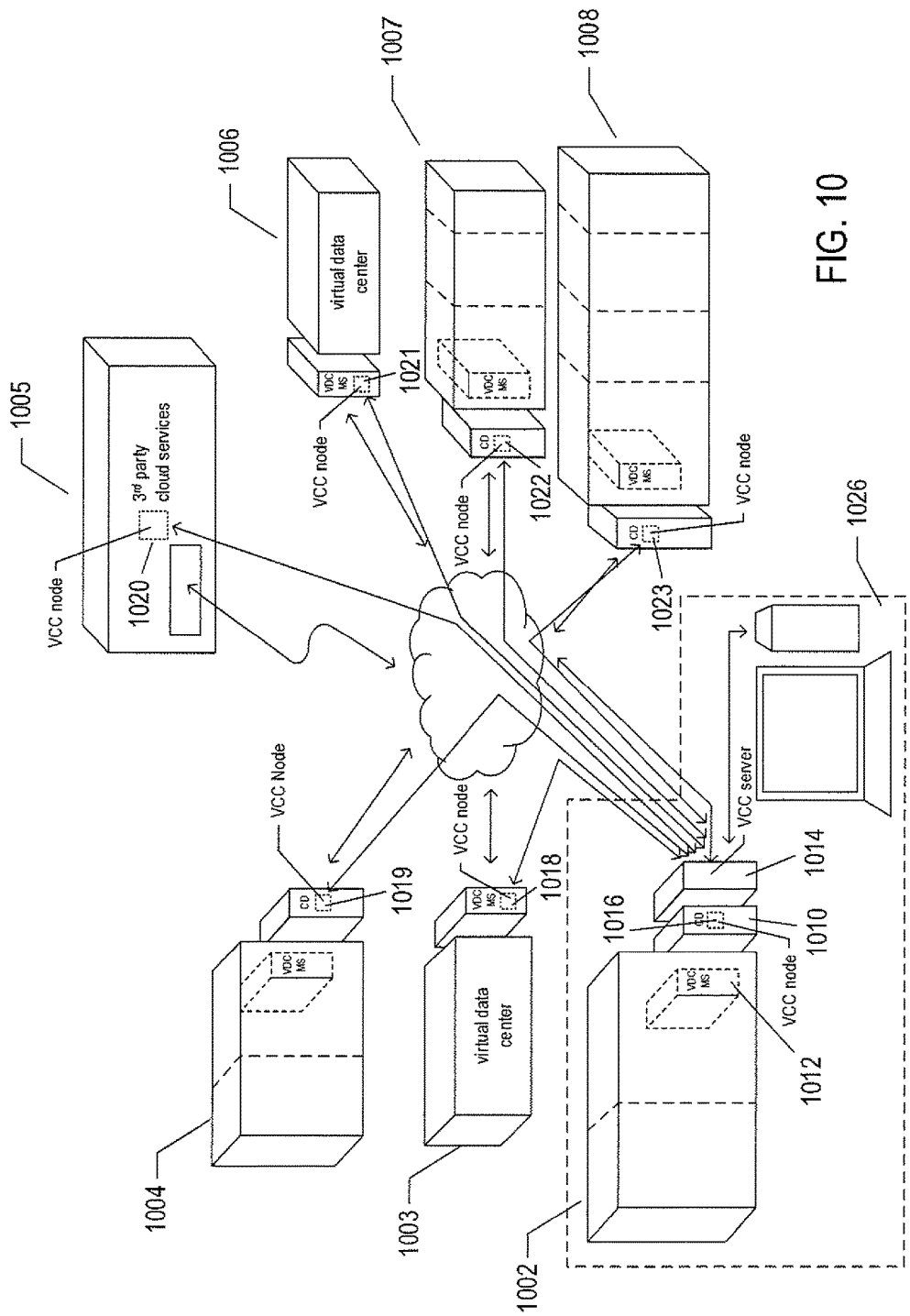
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods and Systems to Identify and Respond to Low-priority Event Messages

Figure 11:
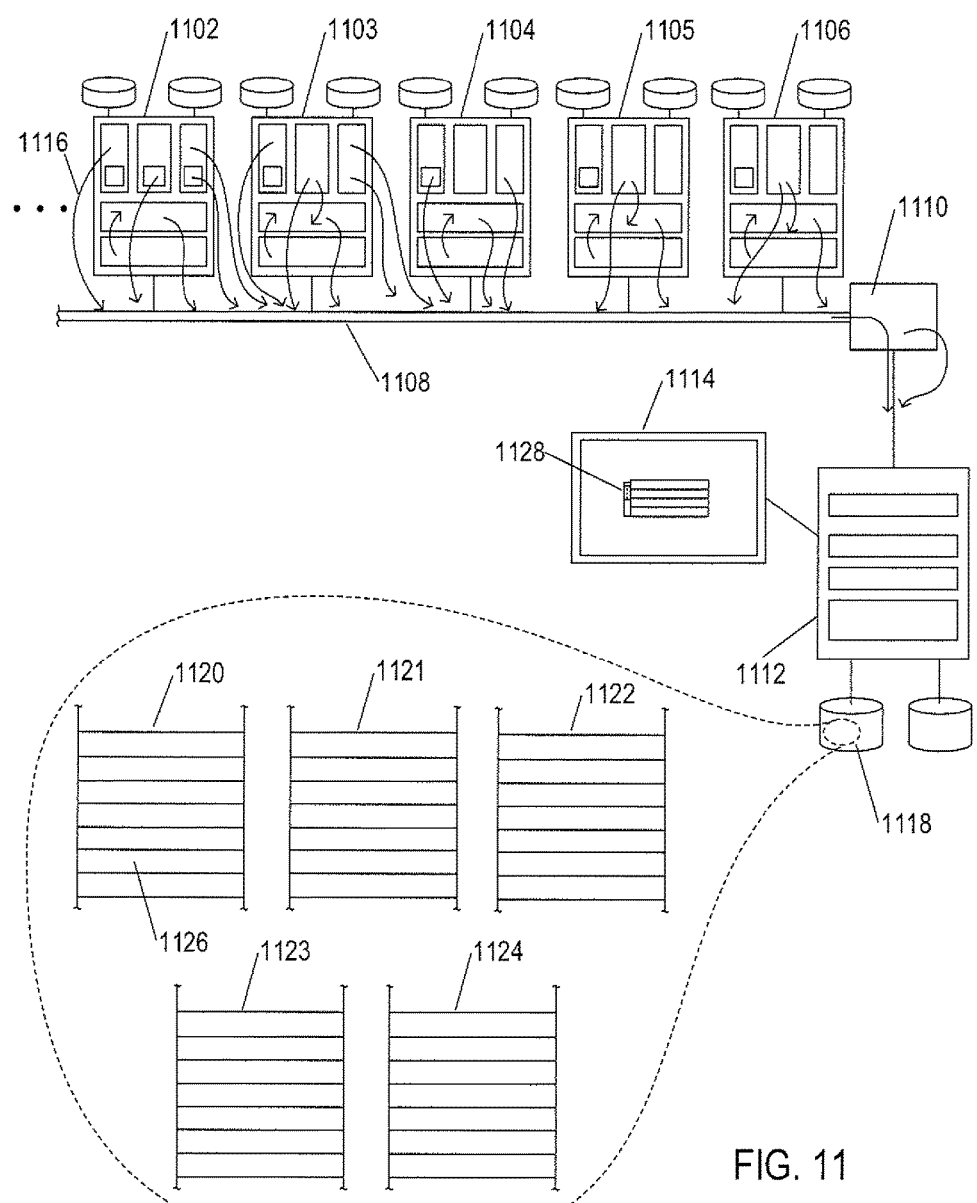
FIG. 11 shows an example of logging of event messages in event-log files.

FIG. 11 shows an example of logging event messages in event-log files. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102-1106 as well as the communications bridge/router 1110 generate event messages that are transmitted to the administration computer 1112. Event messages may be generated by application programs, operating systems, VMs, guest operating systems, and other computer programs running on the computer systems 1102-1106 and the bridge/router 1110. Event messages may be relatively directly transmitted from a component within a discrete computer system to the administration computer 1112 or may be collected at various hierarchical levels within a discrete computer system and then forwarded from an event-message-collecting entity within the discrete computer system to the administration computer 1112. The administration computer 1112 collects and stores the received event messages in a data-storage device or appliance 1118 as event-log files 1120-1124. Rectangles, such as rectangle 1126, represent individual event messages. For example, event-log file 1120 may comprise a list of event messages generated within the computer system 1102. Event messages of any one or more of the event-log files may be displayed and interacted with using a graphical user interface ("GUI") 1128 displayed on the administrative console 1114.

Figure 12:
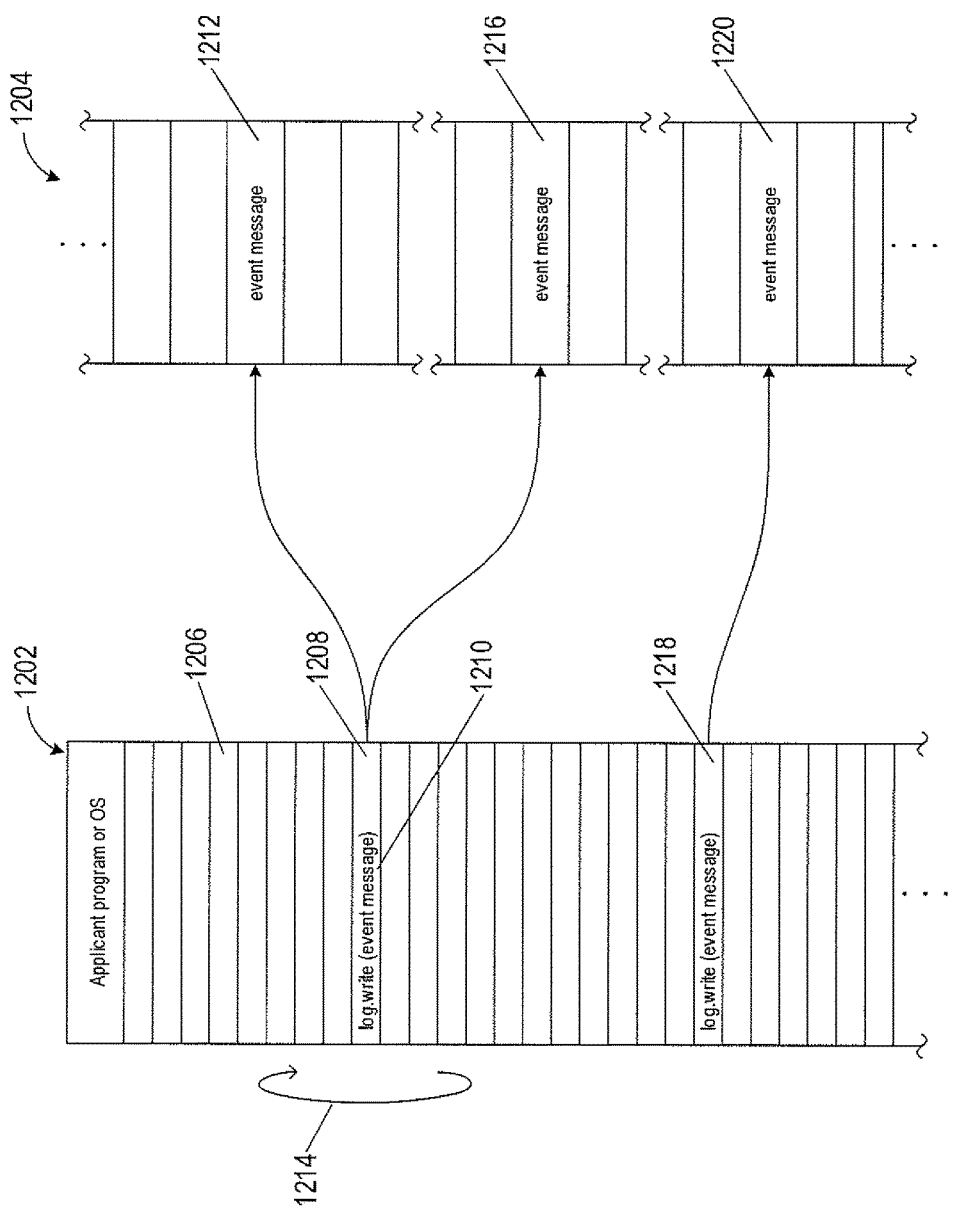
FIG. 12 shows an example source code and a corresponding event-log file.

FIG. 12 shows an example of a source code 1202 and an example of a corresponding event-log file 1204. The source code 1202 may be the source code of an application program, an operating system, a VM, a guest operating system, or any other computer program or machine code. Rectangles, such as rectangle 1206, represent a definition, a comment, a statement, or a computer instruction that expresses some action to be executed by a computer. The source code 1202 includes log write instructions that generate event messages that are in turn written to the event-log file 1204. For example, source code 1202 includes an example log write instruction 1208 that when executed writes an event message 1212 to the event-log file 1204. Note that the notation "log.write()" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event-log file to which the event message is written. Log write instructions are written in a source code by the developer of an application program or operating system in order to record events that occur while an operating system or application program is running. For example, a developer may include log write instructions that are executed when certain events occur, such as failures, logins, or errors.

FIG. 13 shows an example of a log write instruction 1302. In the example of FIG. 13, the log write instruction 1302 includes arguments identified with "$." For example, the log write instruction 1302 includes a time-stamp argument 1304, a thread number argument 1305, and an internet protocol ("IP") address argument 1306. The example log write instruction 1302 also includes text strings and natural-language words and phrases that identify the type of event that triggered the log write instruction, such as "Repair session" 1308. The text strings between brackets "[ ]" represent file-system paths, such as path 1310. When the log write instruction 1302 is executed, parametric values are assigned to the arguments and the text strings and natural-language words and phrases are recorded as an event message in an event-log file.

FIG. 14 shows an example of an event message 1402 generated by the log write instruction 1302. The arguments of the log write instruction 1302 are assigned numerical parameters that are recorded in the event message 1402 at the time the event message is written to the event-log file. For example, the time stamp 1304, thread 1305, and IP address 1306 of the log write instruction 1302 are assigned corresponding numerical parameters 1404-1406 in the event message 1402. The time stamp 1404, in particular, represents the date and time the event message is generated. The text strings and natural-language words and phrases of the log write instruction 1302 also appear unchanged in the event message 1402.

Figure 15:
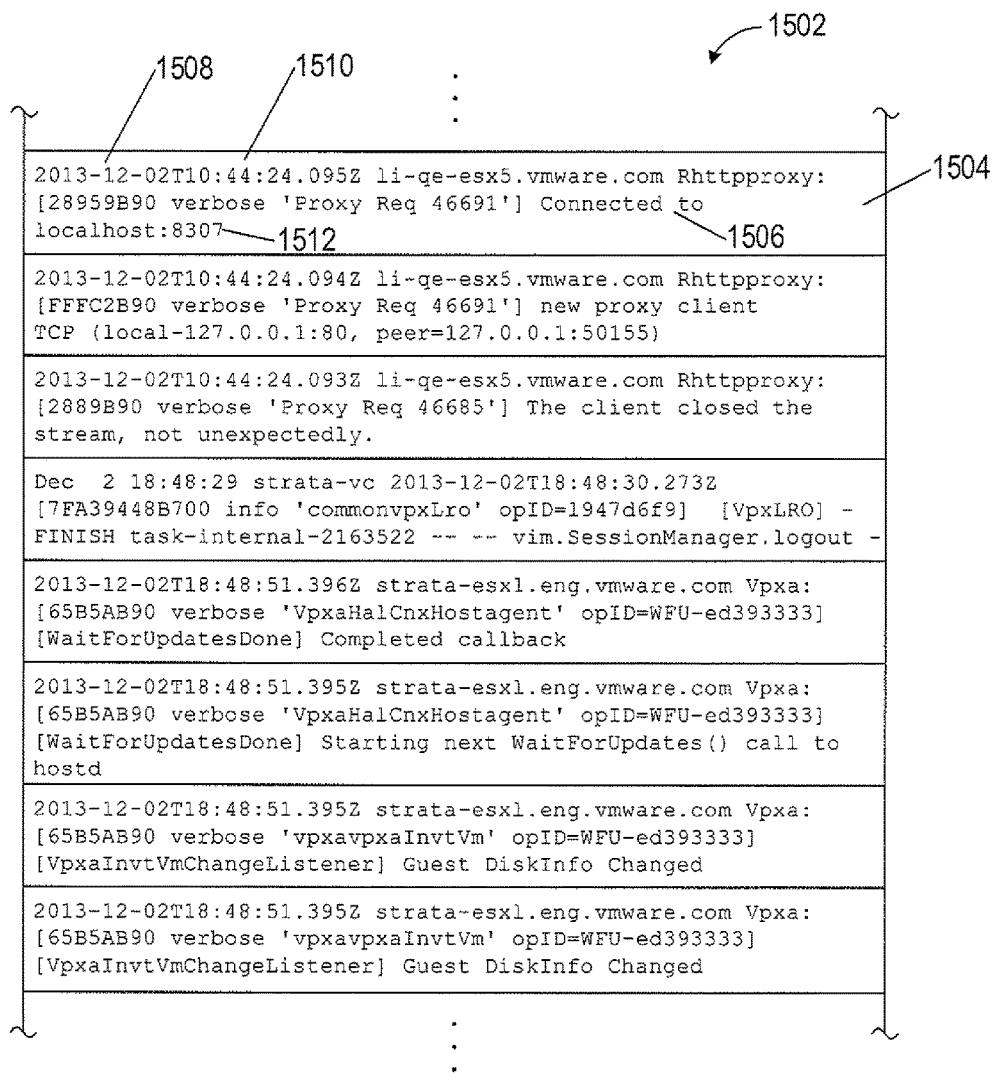
FIG. 15 shows a small, eight-entry portion of an event-log file.

FIG. 15 shows a small, eight-entry portion of an event-log file 1502. In FIG. 15, each rectangular cell, such as rectangular cell 1504, of the portion of the event-log file 1502 represents a single stored event message. For example, event message 1502 includes a short natural-language phrase 1506, date 1508 and time 1510 numerical parameters, as well as, a numerical parameter 1512 that appears to identify a particular host computer.

In large distributed computing systems, the number of event messages recorded in event-log files each day may be in or exceed the terabytes range. Ideally, event messages are analyzed in real time as they are generated and received, and may also be analyzed retrospectively, after the event messages have been initially processed and stored in event-log files. However, retaining such large numbers of event messages creates storage problems. For example, all of the storage space typically allotted to store event-log files may be exceeded, creating problems associated with where to store the excess event messages. One source of such large numbers of event messages may be that certain log write instructions are repeatedly executing during running of an application program or operating system. For example, returning to FIG. 12, the log write instruction 1208 may be embedded within a set of computer instructions that are repeatedly executed in a loop 1214. As a result, the same event message is generated and recorded with different time stamps in the event-log file 1204. For example, the event message 1210 of log write instruction 1208 appears as event messages 1212 and 1216 in the event-log file 1204, with the only difference being the time and date of the associated time stamps. The same type of log write instructions may also be located throughout the source code, which in turns creates repeats of essentially the same type of event message in the event-log file. For example, log write instruction 1218 creates the same type of event message 1220 in the event-log file 1204 as event messages 1212 and 1216 with different time stamps. Event-log files may also record event messages that are not relevant to an IT administrator. For example, the administrator may not be interested in event messages that record user logouts from a system. Event messages that are recorded with high frequency and/or are considered irrelevant to an IT administrator are collectively referred to as "low-priority event messages."

Methods described below enable an IT administrator, or other user, to identify types of event messages recorded in event-log files as low-priority event messages and enable the IT administrator, or other user, to control which low-priority event messages are stored, how often the low priority messages are stored, and how long the low-priority messages are retained in storage.

The text strings and natural-language words and phrases of each event message describe a particular type of event called an "event type." For example, the text strings and natural-language words and phrases, called "non-parametric tokens," of the event message 1402 shown in FIG. 14 identify the event type. As explained above, each time the log write instruction 1302 of FIG. 13 is executed, only the parameter values are changed, such as the time and date. The non-variable text strings and natural-language words and phrases (i.e., non-parametric tokens) are the same for each event message generated by the log write instruction 1302 and stored in the event-log file. Event-type analysis may be used to identify the event type of each event message based on the non-parametric tokens, and event messages of the same event type may be counted and stored in an event-type log file.

Figure 16:
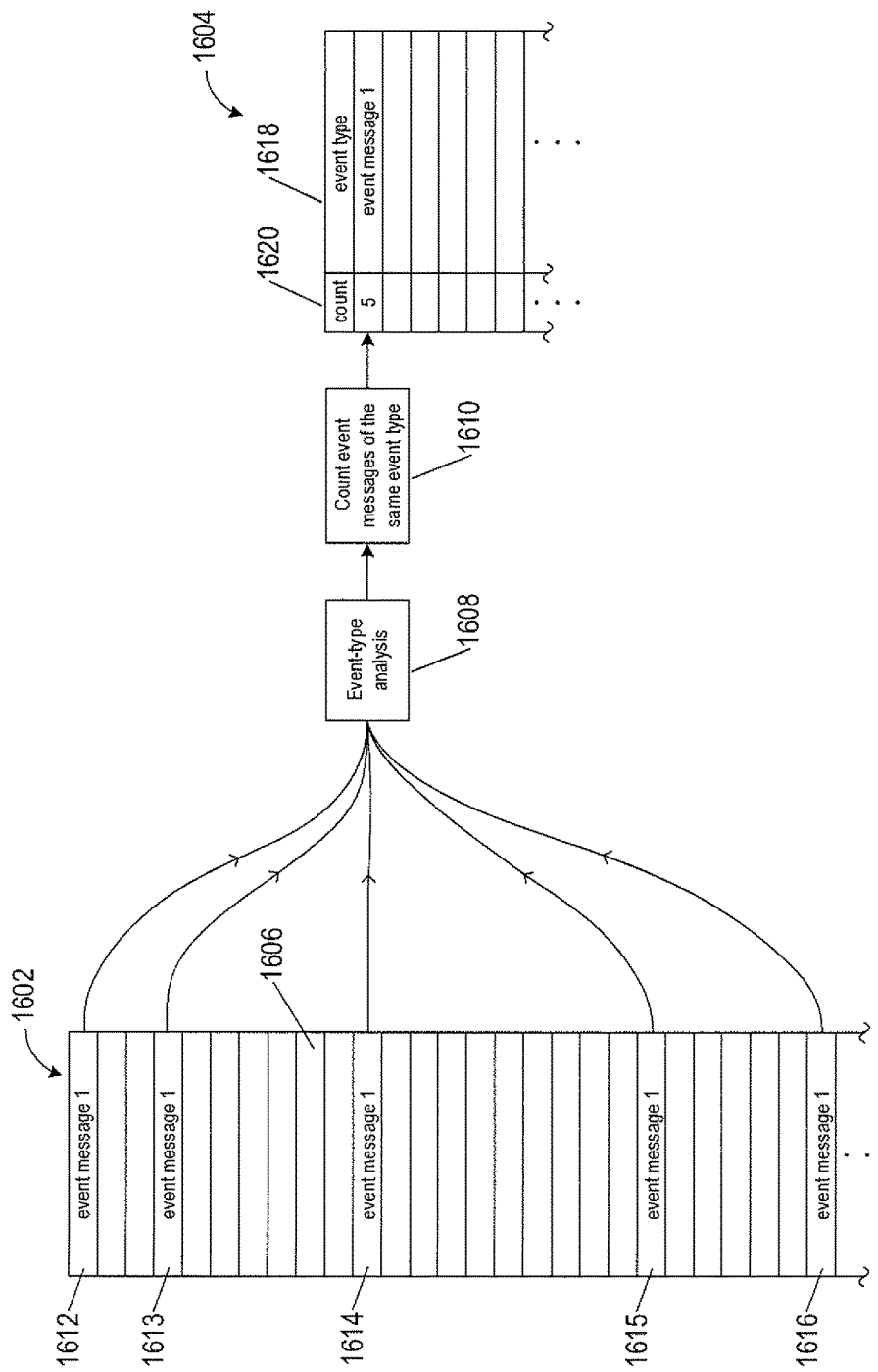
FIG. 16 shows event messages of an event-log file sorted according the event type in an event-type log file.

FIG. 16 shows event messages of an event-log file 1602 sorted according the event type to generate an event-type log file 1604. Rectangles, such as rectangle 1606, represents event messages recorded in the event-log file 1602. Event-type analysis 1608 is applied to each event message of the event-log file 1602 in order to determine the non-parametric tokens of each event message of the event-log file 1602. Event messages having the same non-parametric tokens are of the same event type. Event messages of the same event type are counted 1610. For example, the five event messages denoted by "event message 1" 1612-1616 are identified using event-type analysis 1608 as being of the same event type, but may have different parametric values, such as time and date. Event messages of the same event type are counted 1610 and the most recent of the event message 1 represents the event type in the event-type log file 1604. Column 1618 lists the most recently generated event messages of the same event type. Column 1620 lists associated counts of the different event types.

In certain implementation, methods may automatically identify low-priority event types based on the number of times and/or ways an administrator or user interacts with the event messages. There are a number of ways in which an administrator or user may interact with event messages. Example interactions include, but are not limited to, an administrator or user may add a field, word, or phrase to an event message; an administrator or user may search for more context using a particular event message as the center of a search; an administrator or user may search for particular event types; or an administrator or user may view in a display an event type they interest in.

Figure 17:
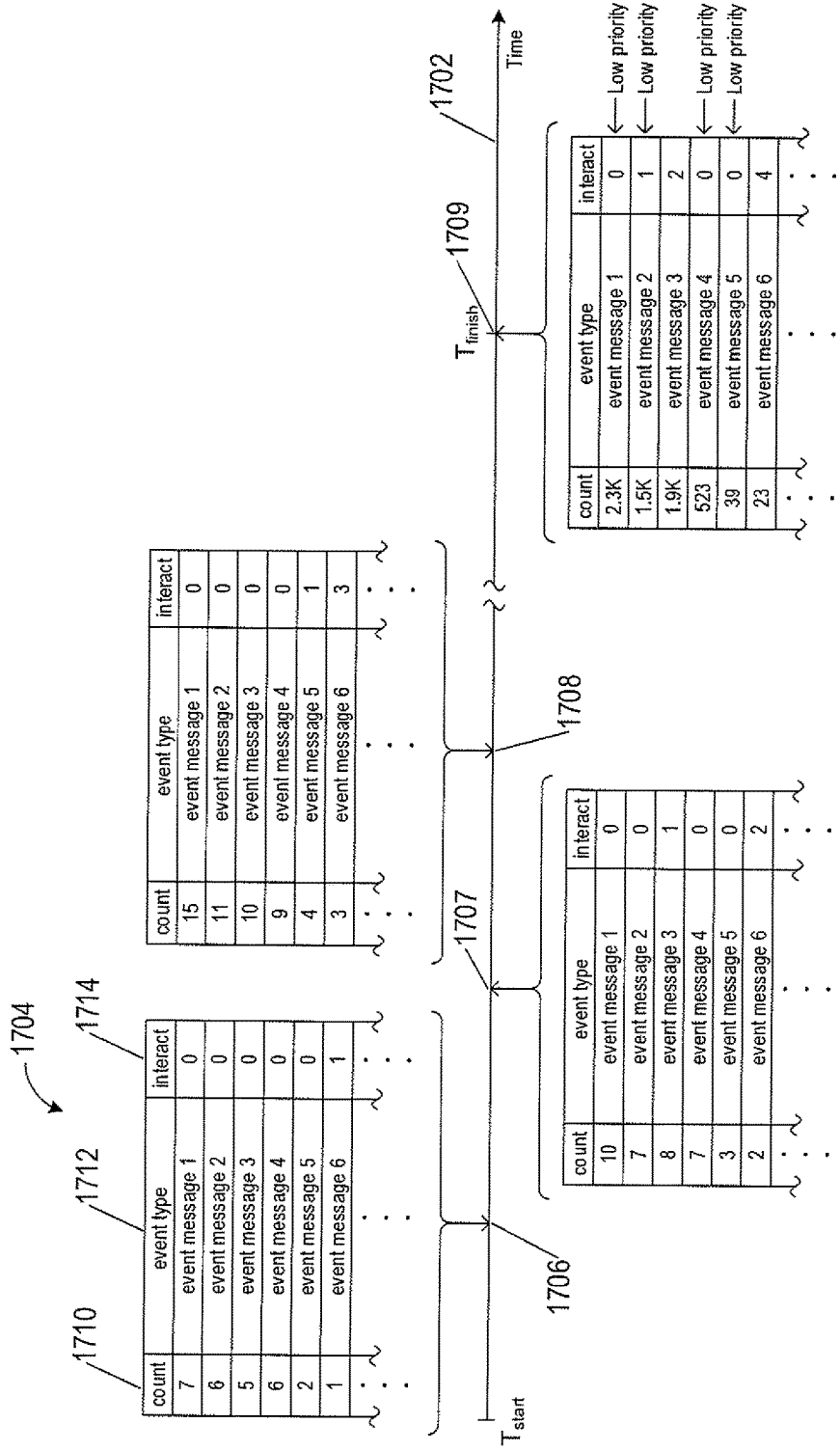
FIG. 17 shows counts of event types and numbers of interactions with event messages of the event types.

FIG. 17 shows counts of event types and numbers of interactions by an administrator or user that changes over a time period and may be used to identify certain event types as low-priority event types. Directional arrow 1702 represents passage of time. The time Tstart represents beginning of a time period over which event messages are recorded. In FIG. 17, the number of counts associated with each event type and number of interactions with each event type are updated in the same event-type log file 1704 at different times 1706-1709. Column 1710 lists the counts of each event type represented by the most recently generated event messages listed in column 1712. Event-type log file 1704 includes a column 1714 that lists the number of interactions with event messages of each event type. As time passes, the count of each event type increases with the counts of certain event types increasing more rapidly than others. For example, the event type represented by event message 1 increased from a count of 7 at time 1706 to a count of about 2,300 at time 1709. By contrast, the event type represented by event message 6 increased from a count of 1 at time 1706 to a count of about 23 at time 1709. High frequency event types may correspond to log write instructions that are embedded in loops or are repeated throughout the source code, while low frequency event types may correspond to log write instructions embedded in lines of the source code that indicate a special circumstance has occurred, such as an error, disk failure, and high CPU usage. Event types that occur with a high frequency and a low interaction over the same period of time, such as $T_{finish} - T_{start}$, may be identified as "low-priority event types." User defined thresholds may be used to determine what constitutes high frequency and low number of interactions. An event type may be identified as a low-priority event type over a period of time T, when both of the following conditions are satisfied:

$$C \geq T_C \tag{1a}$$

$$T_N \geq N_{int} \tag{1b}$$

where $T=T_{finish}-T_{start}$ is a period of time;

C is the number of counts of the event type within the period of time T;

$N_{int}$ is the number of interactions with the event type by a user within the period of time T;

$T_C$ is a number of counts threshold; and $T_N$ is a number of interactions threshold.

For example, in FIG. 17, event types represented by event messages 1, 2, 4, and 5 are identified as low-priority event types in the time period $T=T_{finish}-T_{start}$.

Figure 18:
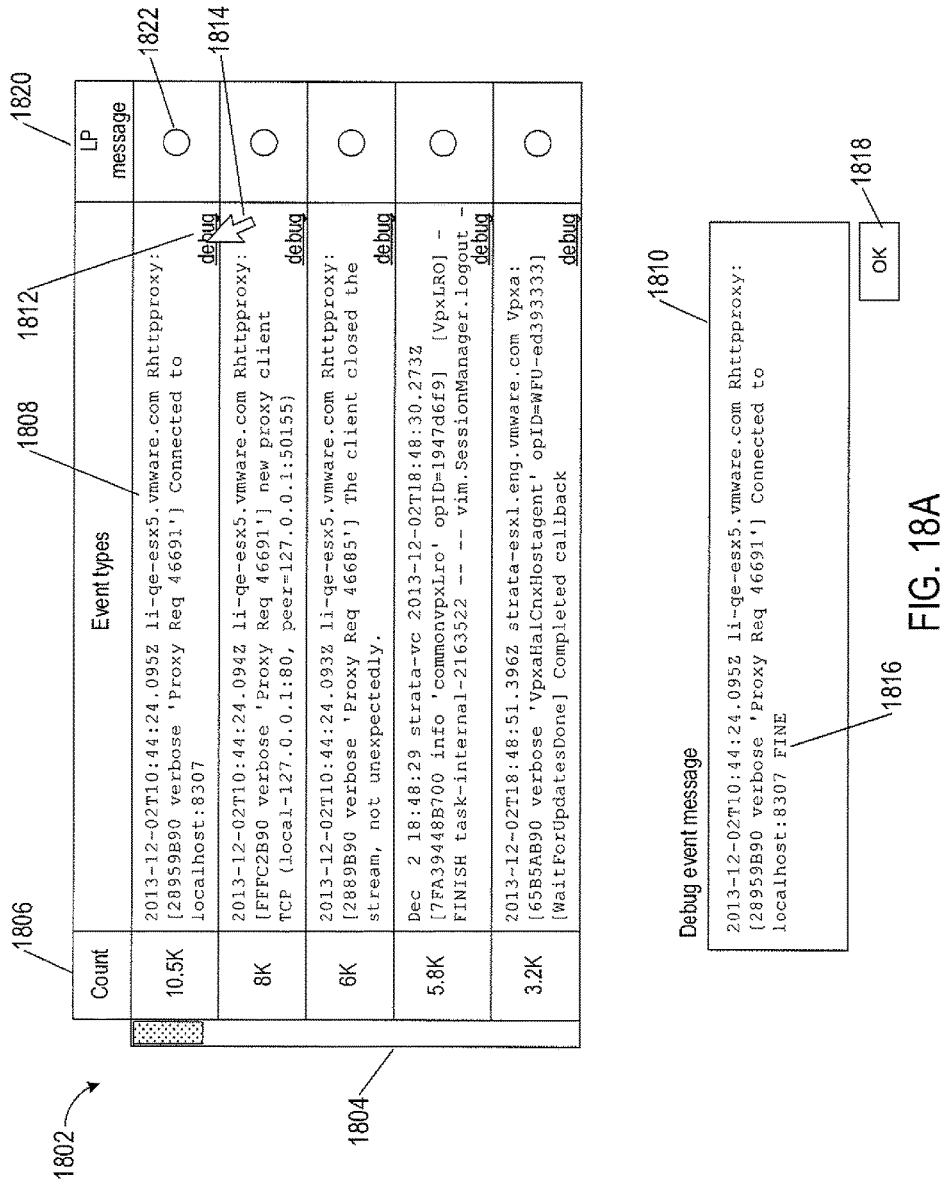
FIGS. 18A-18B shows an example graphical user interface ("GUI") that displays an event-type log file and allows a user to select low-priority event types.

In other implementations, a user may select different event types as low-priority event types. Methods may provide a GUI 1802 shown in FIGS. 18A-18B that displays the event-type log file and allows a user to select which event types are low priority. In FIG. 18A, the GUI 1802 displays different event types and counts associated with each event type in a table. The user may use a scrollbar 1804 to scroll up and down through the list of event types. Each event type is represented by a most recently generated event message. The table also displays counts of each event type in a column 1806. For example, an event type represented by event message 1808 has been generated about 10,500 times over a period of time. Each event type may include a "debug" link. When a user clicks on a "debug" link, the event type is displayed in a separate editable field 1810. For example, when a user clicks on "debug" 1812 with a cursor 1814, the event message 1808 is reproduced in the field 1810. In this example, the user adds the word "FINE" 1816 to indicate the level of importance of the event messages of the event type is not indicative of a problem. The user may add other descriptions to indicate the level of importance of an event type. For example, a user may designate certain event types as "warnings," other event types as "severe," and still others as "critical." The user may also add the source or any other information the user decides is relevant to event messages of the event type 1808 by clicking on the "OK" button 1818. The table presented in the GUI 1802 includes a column 1820 that enables the user to designate event types as low-priority ("LP message") by clicking on the circles, such as circle 1822. In this example, unshaded circles indicate that the corresponding event types are not identified as low priority. On the other hand, a shaded circle indicates that an event type has been designated as low priority. In FIG. 18B, the GUI 1802 event types represented by event messages 1808 and 1824 are identified as low-priority event types as represented by shaded circles 1822 and 1826. A user may also use the GUI 1802 to change the status of an event type from low priority to higher priority by clicking on one of the shaded circles 1822 and 1826. For example, suppose the event type 1824 was designated as low priority by the user or automatically designated as described above with reference to FIG. 17. A user may change the priority status of the event type 1824 by clicking on the circle 1826, which would change the circle from shaded to unshaded, indicating that the event type 1824 is not low priority. Event messages of the event types 1808 and 1824 are set to low priority when the user clicks on the "OK" button 1828.

Figure 19:
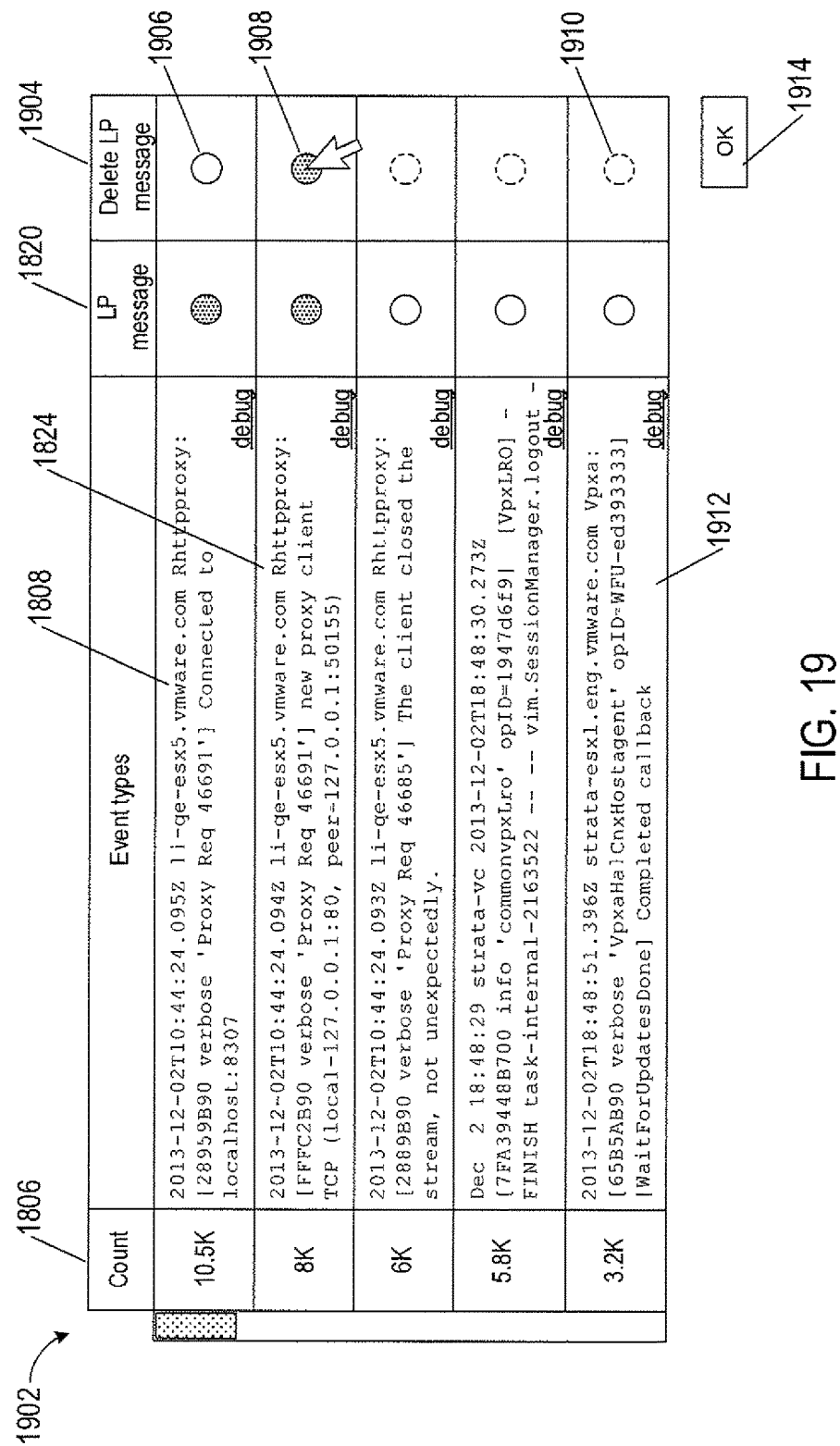
FIG. 19 shows a GUI that enables a user to selectively delete low-priority event types.

Methods allow a user to act on low priority messages that have either been automatically designated as low-priority event types as described above with reference to FIG. 17 or identified as low-priority event types by a user as described above with reference to FIGS. 18A-18B. In certain implementations, a GUI may be displayed that enables a user to selectively delete low-priority event types. FIG. 19 shows a GUI 1902 that is essentially the same as the GUI 1802 described above with reference to FIGS. 18A-18B except the GUI 1902 includes a column 1904 of buttons that enable a user to select event types designated as low priority for deletion. For example, event types 1808 and 1824 are identified as low-priority event types, as described above with reference to FIG. 18B, which activates buttons 1906 and 1908. A user may select either or both of the event types 1808 and 1824 for deletion by clicking on one or both of the buttons 1906 and 1908. For example, a user clicks on button 1908 to select low-priority event type 1822 for deletion. Dashed circles, such as dashed circle 1910 in column 1904, represent inactive buttons of event types that have not been identified as low priority in column 1820, such as event type 1912. When a user clicks on "OK" button 1914, the event messages represented by the event type 1824 are deleted from the corresponding event-long file.

Figure 20:
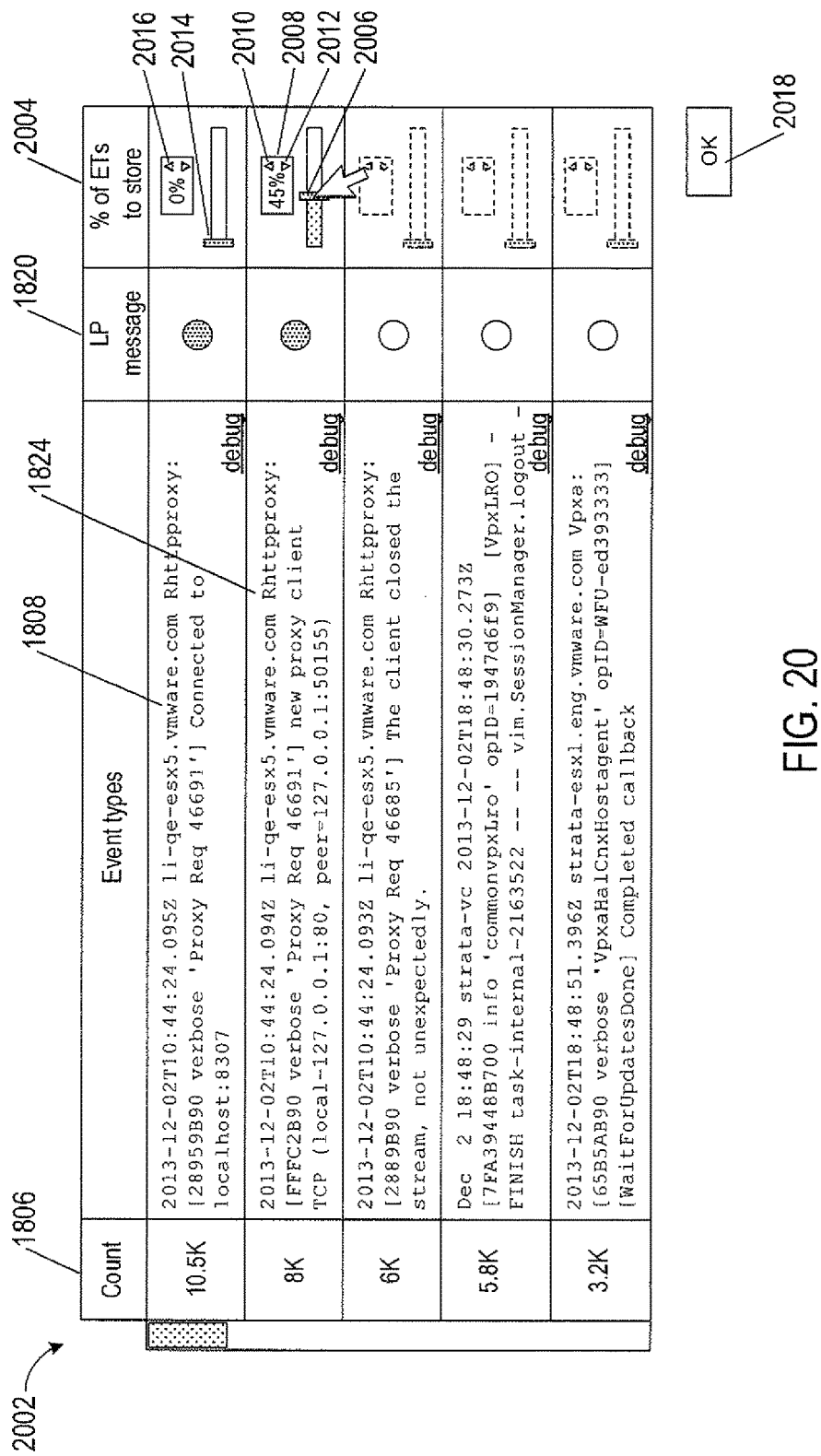
FIG. 20 shows a GUI that enables a user to selectively store a sample set of each low-priority event message.

In other implementations, a GUI may be displayed to enable a user to selectively store a sample set of low-priority event types and a count of how many low-priority event types have been stored. FIG. 20 shows a GUI 2002 that is essentially the same as the GUI 1802 described above with reference to FIGS. 18A-18B, except the GUI 2002 includes a column 2004 of slider bars and fields that enable a user to selectively retain and store a sample set of event messages identified as low priority. For example, event type 1824 has been identified as low priority in column 1820. A user selects 45% of the event messages of event type 1824 for storage in the event-log file by sliding bar 2006 until 45% is displayed in the field 2008. A user may also use the up and down arrows 2010 and 2012 to select a percentage of event messages of the event type 1824 for storage in the event-log file. A user may also decide to delete or discard all of the event messages of a low-priority event type by selecting 0%. For example, event type 1808 has been identified as low priority in column 1820. A user selects 0% of the event messages of event type 1824 for storage in the event-log file by sliding bar 2014 until 0% is displayed in the field 2016. When a user clicks on "OK" button 2018, about 45% of the event messages represented by the event type 1824 are stored in the event-log file while the remainder are deleted and 0% (i.e., none) of the event messages represented by the event type 1808 are stored in the event-log file. The slider bars and fields corresponding to event types that have not been identified as low priority are not activated. The event messages may be stored at random based on the user-selected percentage as follows. When an event message of the event type having a user-selected percentage for storage, denoted by P, is received, a random number, denoted by $n_{ran}$, between 0 and 1 (i.e., $0 \leq n_{ran} \leq 1$) may be generated using a random number generator. When $n_{ran} \leq P/100$, the event message is stored in the event-log file. On the other hand, when $n_{ran} > P/100$, the event message is deleted and not stored in the event-log file.

In other implementations, a GUI may be displayed to enable a user to select different retention times for low-priority event types. FIG. 21 shows a GUI 2102 that is essentially the same as the GUI 1802 described above with reference to FIGS. 18A-18B, except the GUI 2102 includes a column 2104 of separate fields identified as days that enable a user to selectively store event messages of each low-priority event type for different periods of time before the event messages are deleted. Event types 1808 and 1824 have been identified as low priority which activates fields 2106 and 2108 for entering retention time in days. For example, event type 1808 has a retention time of 7 days and event type 1824 has a retention time of 2 days. The fields associated with event types that have not been identified as low priority are not activated. When a user clicks on "OK" button 2110, retention times are created for event messages of the event types 1808 and 1824.

FIG. 22 shows a general form of an example event message 2202 with characters represented by "#." As explained above, event messages have time stamps that identify the date and time the event message was generated and written to an event-log file. For example, $T_{stamp}$ 2204 represent the date and time of the time stamp of the event message 2202. Let $T_{ret}$ represent a user selected retention time as described above with reference to FIG. 21. The event message 2202 may be deleted from an event-log file when the following conditions are satisfied:

$$when\ T_{ret} \neq 0\ and\ C_{stamp} - T_{stamp} \geq T_{ret} \quad (2)$$

where $C_{stamp}$ represents a current stamp.

In other implementations, the fields for setting the retention times in FIG. 21 may include any one or more of years, months, weeks, seconds, and fractions of a second.

In other implementations, a GUI may be used to display for a user event types that may be candidate low-priority event types. Candidate low-priority event types are event messages that have not been automatically identified as a low-priority event type, as described above with reference to FIG. 17, or by a user, as described above with reference to FIGS. 18A-18B, but may take up a large amount of storage capacity.

Figure 23:
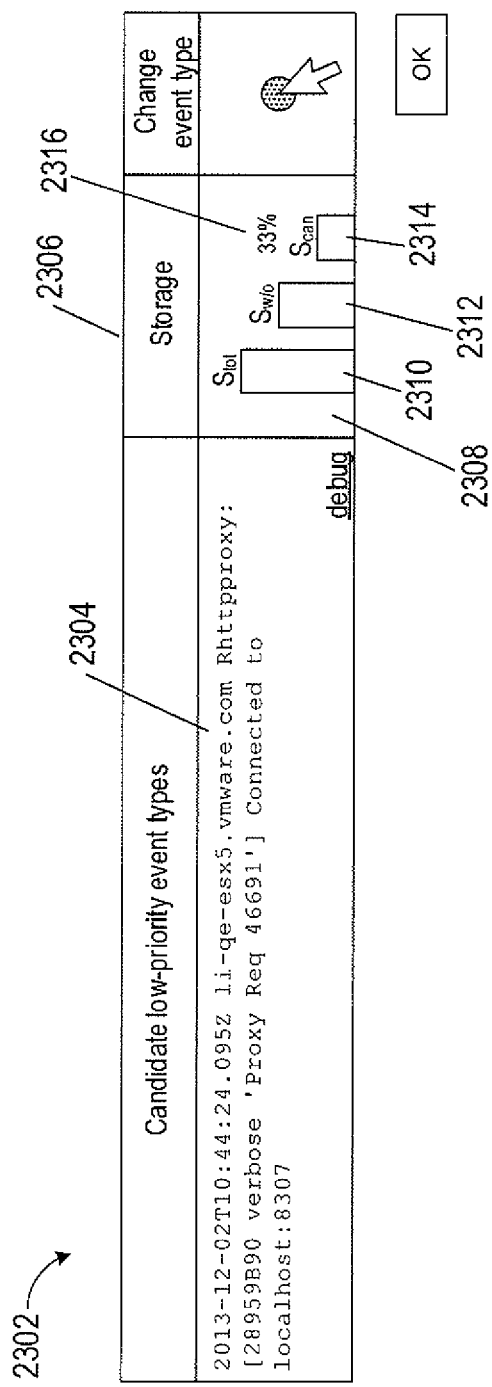
FIG. 23 shows a GUI that enables a user to identify a candidate low-priority event type as a low-priority event type.

FIG. 23 shows a GUI 2302 of a candidate low-priority event type 2304 that appears in the list of event types of FIG. 18A-18B but has not been identified as a low-priority event type. Let $S_{can}$ represent the amount of storage occupied by the event messages of the event type 2304. When the amount of storage $S_{can}$ is greater than a event message storage threshold $Th_{stor}$ (i.e., $S_{can} \geq Th_{stor}$), the GUI 2302 may be generated in order to present the event type 2304 as a candidate low-priority event type. In FIG. 23, the GUI 2302 includes a storage field 2306 that displays a bar graph 2308. Bar 2310 represents the total storage $S_{tot}$ of the event messages in an event-log file or may represent the total storage of the event messages in all of the event-log files. Bar 2312 represents what the storage $S_{w/o}$ would be without having to dedicate the amount of storage $S_{can}$ for the event messages represented by the event type 2304. Bar 2314 represents the storage $S_{can}$ of the event messages. A quantity 33% 2316 (i.e., $100 \times S_{can}/S_{tot}$) is displayed to represent how much more storage capacity would be made available if the event messages represented by the event type 2304 were deleted. The GUI 2302 includes a button a user may click on to change the priority of the even type 2304.

Figure 24:
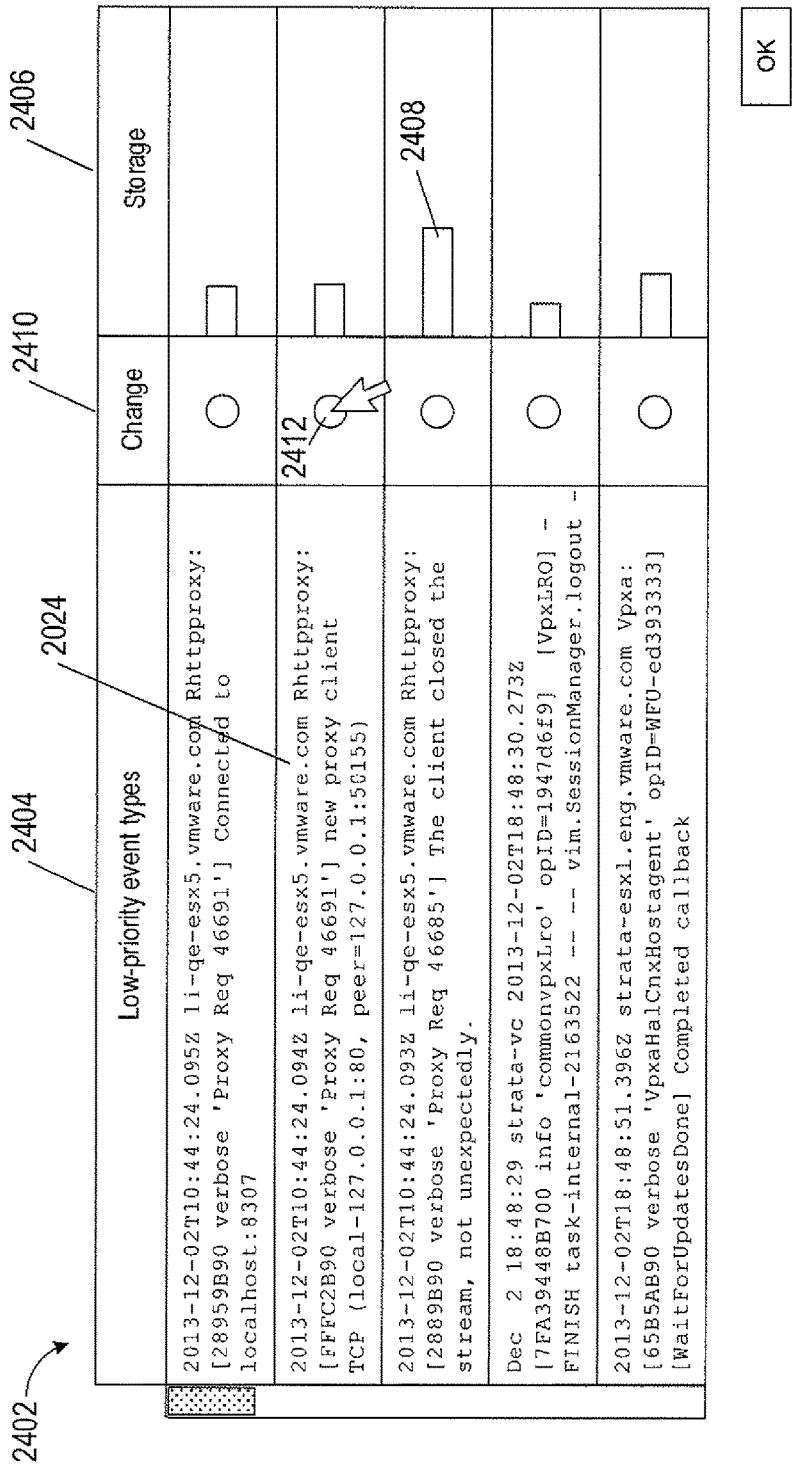
FIG. 24 shows a GUI that enables a user view low-priority event types and associated storage of each low-priority event type.

In other implementations, a GUI may be used to display the current space occupied in one or more data-storage devices by the low-priority event types and allow a user to change the status of the low-priority event types or change how each low-priority event type is treated. FIG. 24 shows a GUI 2402 that displays low-priority event types in a column 2404 and the amount of storage occupied by the event messages of the low-priority event types in column 2406. Bars, such as bar 2408, represent the amount of storage occupied by event messages of each of the event types. Column 2410 list buttons that enable a user to revisit the settings for how each of the event types are treated as determined in one of the GUIs GUI 1902, GUI 2002, and GUI 2102 described above. For example, a user may click on the button 2412 followed by clicking on the "OK" button to generate one of the GUIs GUI 1902, GUI 2002, and GUI 2102 used to determine how event messages for the event type 2024 are to be treated.

In other implementations, a GUI may be used to display the low-priority event types and enable a user to change the low-priority status of the event types and change how the event types are stored. FIG. 25 shows a GUI 2502 that displays a list of low-priority event types in column 2502. Column 2504 displays a column of buttons, each button corresponding to a low-priority event type that enables a user to remove the low priority status of a corresponding event type. Column 2506 displays a column of slide bars and fields, each slide bar and field enables a user to change the percentage of event messages of a particular event type that are to be stored in event-log files as described above with reference to FIG. 20. Column 2508 displays retention time fields that enable a user to decide how long event messages of a particular event type are to be stored as described above with reference to FIG. 21.

FIG. 25 shows an example of GUI 2502 where both percentages and retentions are used in combination to determine how event messages of different low-priority event types are treated. In other implementations, retention times may not be used to store low priority messages and a GUI may display low-priority event types with only columns 2506 and 2508 and not column 2510. In this implementation, only the percentages of the low-priority event messages of may be changed. In still other implementations, percentages may not be used to store low priority messages and a GUI may display low-priority event types with only columns 2506 and 2510 and not column 2506. In this implementation, only the retention times of the low-priority event messages of may be changed.

Figure 26:
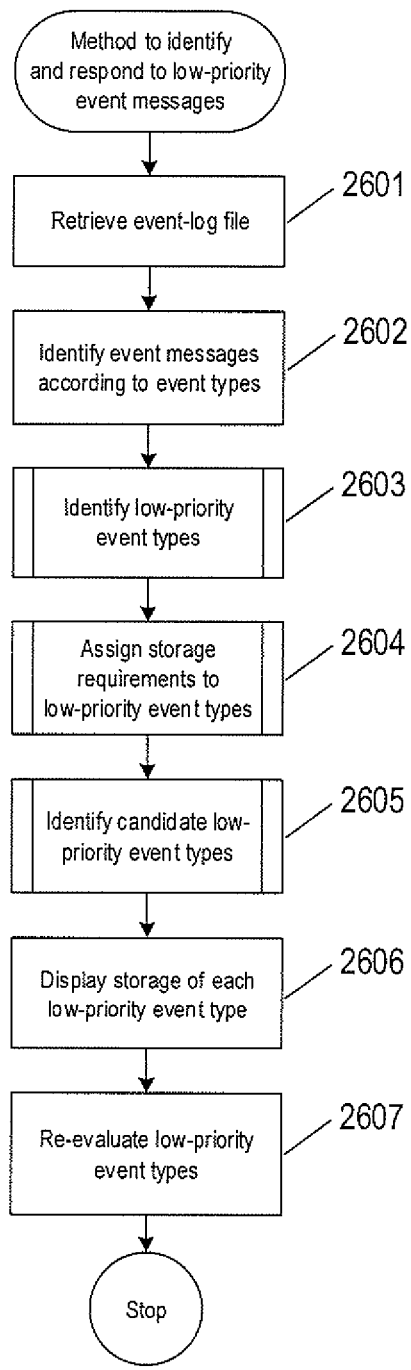
FIG. 26 shows a control-flow diagram of a method to identify and respond to low-priority event messages.

FIG. 26 shows a control-flow diagram of a method to identify and respond to low-priority event messages. In block 2601, an event-log file may be retrieved from storage in a data-storage device. The event-log file comprises numerous different types of event messages as described above with reference to FIGS. 11-16. In block 2602, the event messages are identified according to event type as described above with reference to FIG. 16. In block 2603, a method "identify low-priority event types" is called to identify certain event types as low-priority event types. In block 2604, a method "assign storage requirements to low-priority event types" is called to assign storage requirements to event messages of the different event types. In block 2605, a method "identify candidate low-priority event types" is called to identify event types that have not been identified as low-priority event types as candidate low-priority event types. In block 2606, storage space that the event messages of each low-priority event type occupies in one or more data-storage devices is displayed, as described above with reference to FIG. 24. In block 2607, how each event type is stored in the one or more data-storage devices may be re-evaluated by displaying options for changing how each of the low-priority event types is stored in the one or more data-storage devices.

Figure 27:
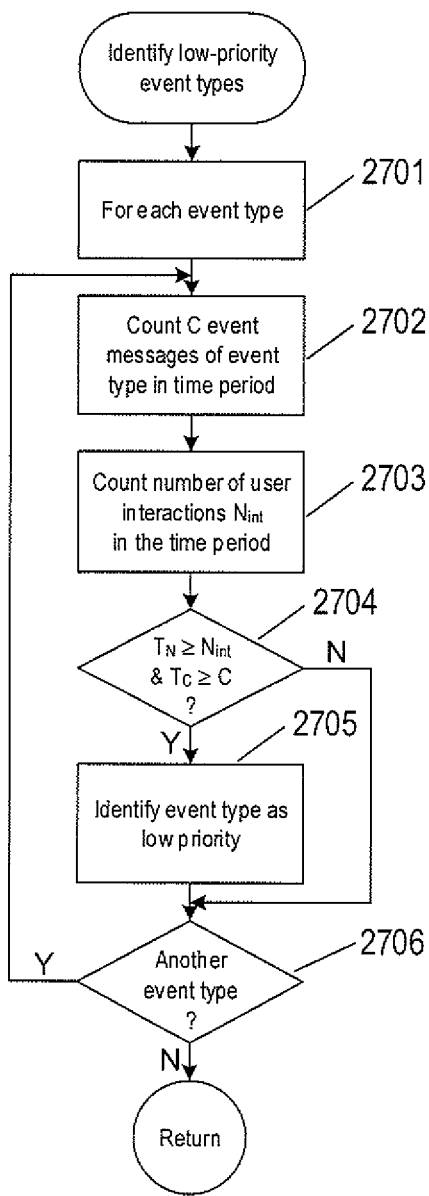
FIG. 27 shows a control-flow diagram of a first approach to the Method "identify low-priority event types" called in FIG. 26.

FIG. 27 shows a control-flow diagram of a first approach to the method "identify low-priority event types" called in block 2603 of FIG. 26. A loop beginning with bock 2701 repeats the operations represented by blocks 2702-2705 for each event type. In block 2702, event messages of the event type are counted over a time period in order to obtain a count C of the event messages of the event type. In block 2703, a number of user interactions $N_{int}$ with the event messages of the event type are counted over the time period. In block 2704, when the conditions described above with reference to Equations (1a) and (1b) are satisfied, control flows to block 2705 and the event type are identified as a low-priority event type and the corresponding event messages are identified as low priority. In decision block 2706, blocks 2702-2705 are repeated for another event type.

Figure 28:
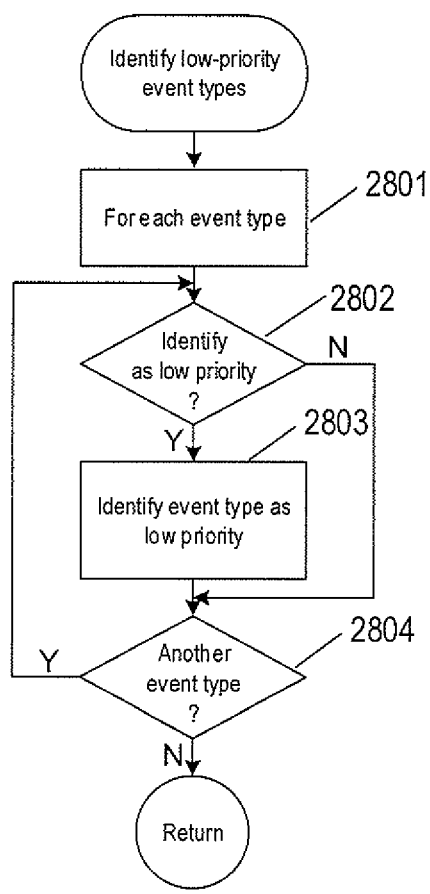
FIG. 28 shows a control-flow diagram of a second approach to the method "identify low-priority event types" called in FIG. 26.

FIG. 28 shows a control-flow diagram of a second approach to the method "identify low-priority event types" called in block 2603 of FIG. 26. A loop beginning with block 2801 repeats the operations represented by blocks 2802-2804. In decision block 2802, when an event type has been identified as low priority by a user, as described above with reference to FIG. 18B, control flows to block 2803. In block 2803, the event type is identified as a low-priority event type and the corresponding event messages are identified as low priority. In decision block 2804, blocks 2802-2804 are repeated for each event type.

Figure 29:
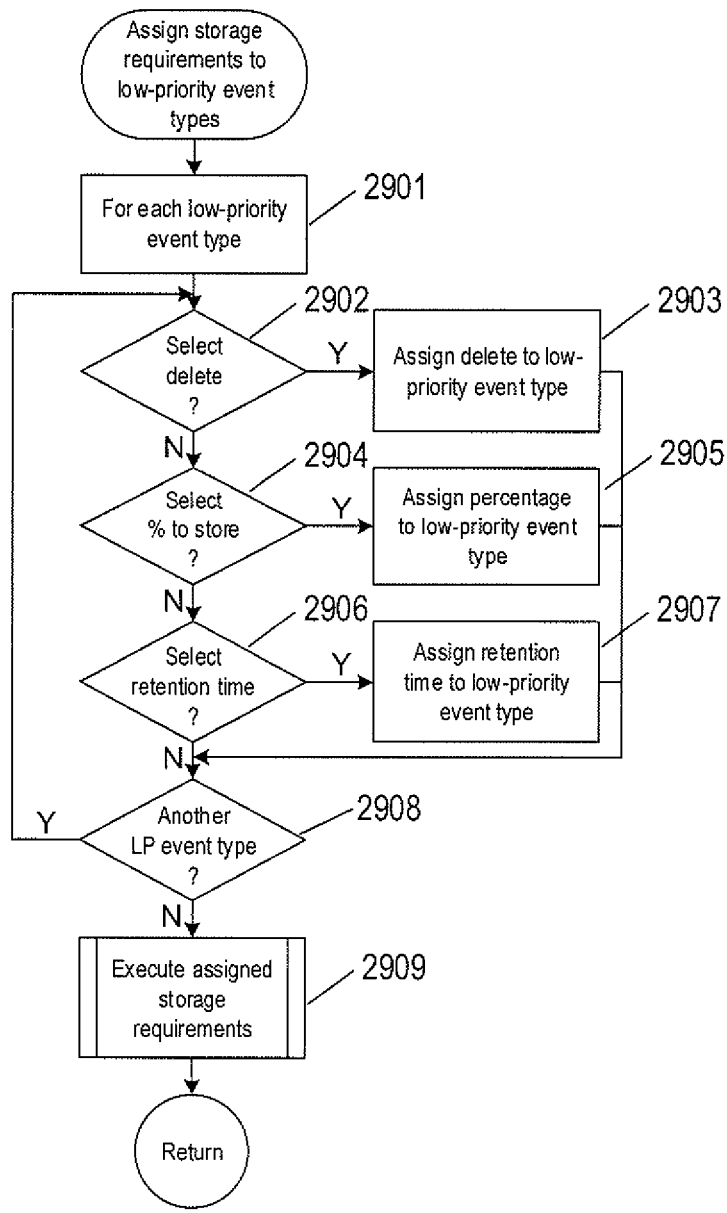
FIG. 29 shows a control-flow diagram of the method "assign storage requirements to low-priority event types" called in FIG. 26.

FIG. 29 shows a control-flow diagram of the method "assign storage requirements to low-priority event types" called in block 2604 of FIG. 26. A loop beginning with block 1901 repeats the operations represented by blocks 2902-2907 for each low-priority event type. In decision block 2902, control flows to block 2903 when the event type has been selected for deletion as described above with reference to FIG. 19. In block 2903, deletion is assigned to the event messages of the low-priority event type. In decision block 2904, control flows to block 2905 when a percentage of the event messages of the low-priority event type has been selected for storage as described above with reference to FIG. 20. In block 2905, the percentage is assigned to the event messages of the low-priority event type. In decision block 2906, control flows to block 2907 when a retention time has been assigned to the event messages of the low-priority event type as described above with reference to FIG. 21. In block 1907, the retention time is assigned to the event messages of the low-priority event type. In decision block 2908, another low-priority event type is selected and blocks 2902-2907 are repeated. In block 2909, a method "execute assigned storage requirements" is called to execute the assignments of blocks 2903, 2905, and 2907.

Figure 30:
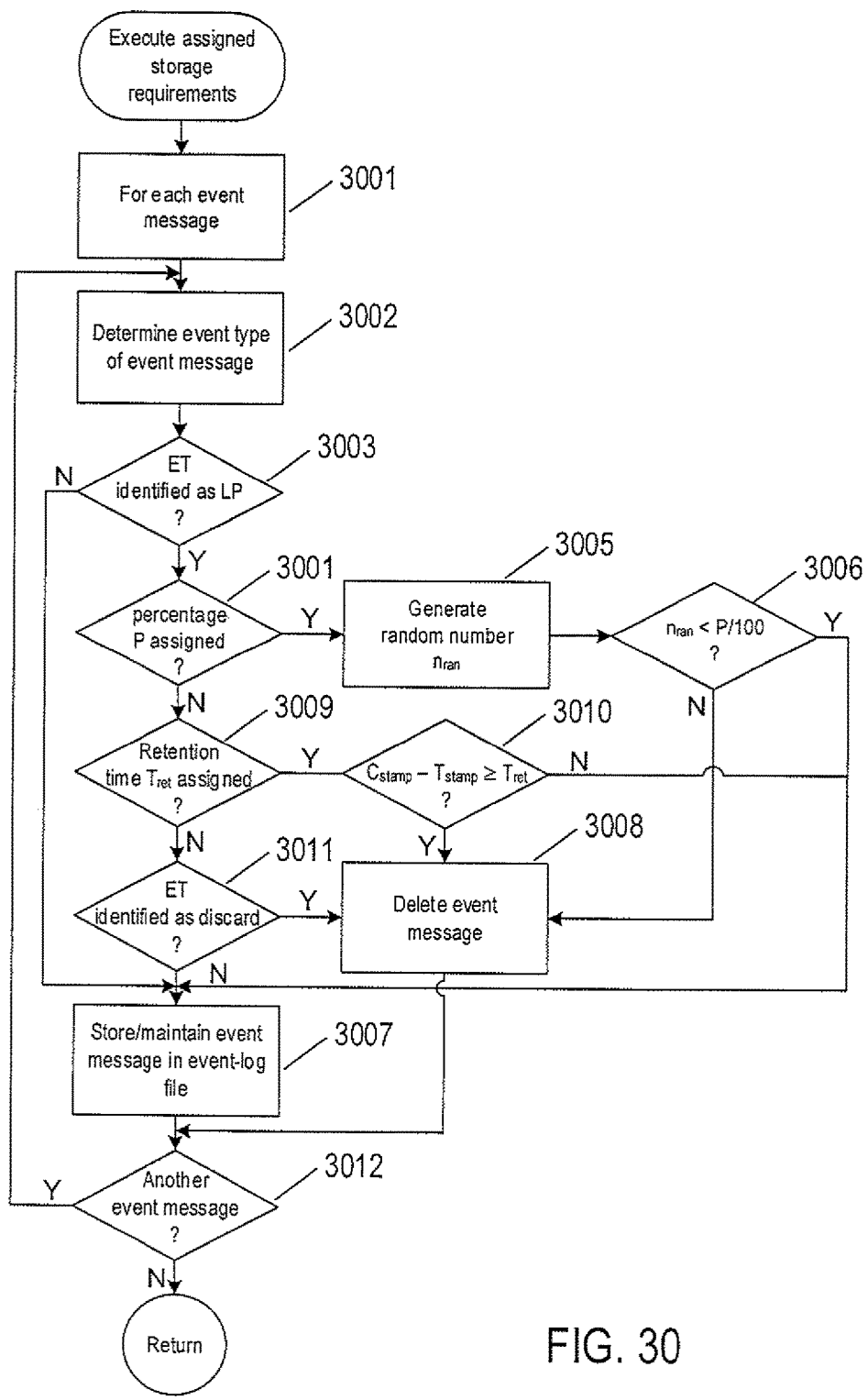
FIG. 30 shows a control-flow diagram of the method "execute assigned storage requirements" called in FIG. 29.

FIG. 30 shows a control-flow diagram of the method "execute assigned storage requirements" called in block 2909 of FIG. 29. A loop beginning with block 3001 repeats the operations represented by blocks 3002-3011. In block 3002, an event message stored in an event-log file or received at an administration computer undergoes event-type analysis determine the event messages event type, as described above with reference to FIG. 16. In decision block 3003, if the event message is a low-priority event type, control flows to decision block 3004. Otherwise, control flows to decision block 3012. In decision block 3004, if a percentage, P, for storing sample event messages has been assigned to the event type, as described above with reference to FIG. 20, control flows to block 3005. In block 3005, a random number, $n_{ran}$, between 0 and 1 is generated using a random number generator. In decision block 3006, when the random number is less than P/100, as described above with reference to FIG. 20, control flows to block 3007. Otherwise, control flows to block 3008. In block 3007, the event messages is stored or maintained in the event-log file. In block 3008, the event message is deleted. In decision block 3009, if a retention time is assigned to the event type, as described above with reference to FIG. 21, control flows to decision block 3010. Otherwise, control flows to decision block 3011. In decision block 3010, when the condition given by Equation (2) is satisfied, control flow to block 3008 and the event message is deleted. Otherwise, control flows to block 3008 and the event message is stored or maintained in the event-log file. In decision block 3011, when the event type is identified for deletion as described above with reference to FIG. 19, control flow to block 3008 and the event message is deleted. In decision block 3012, the operations are repeated for another event message.

Figure 31:
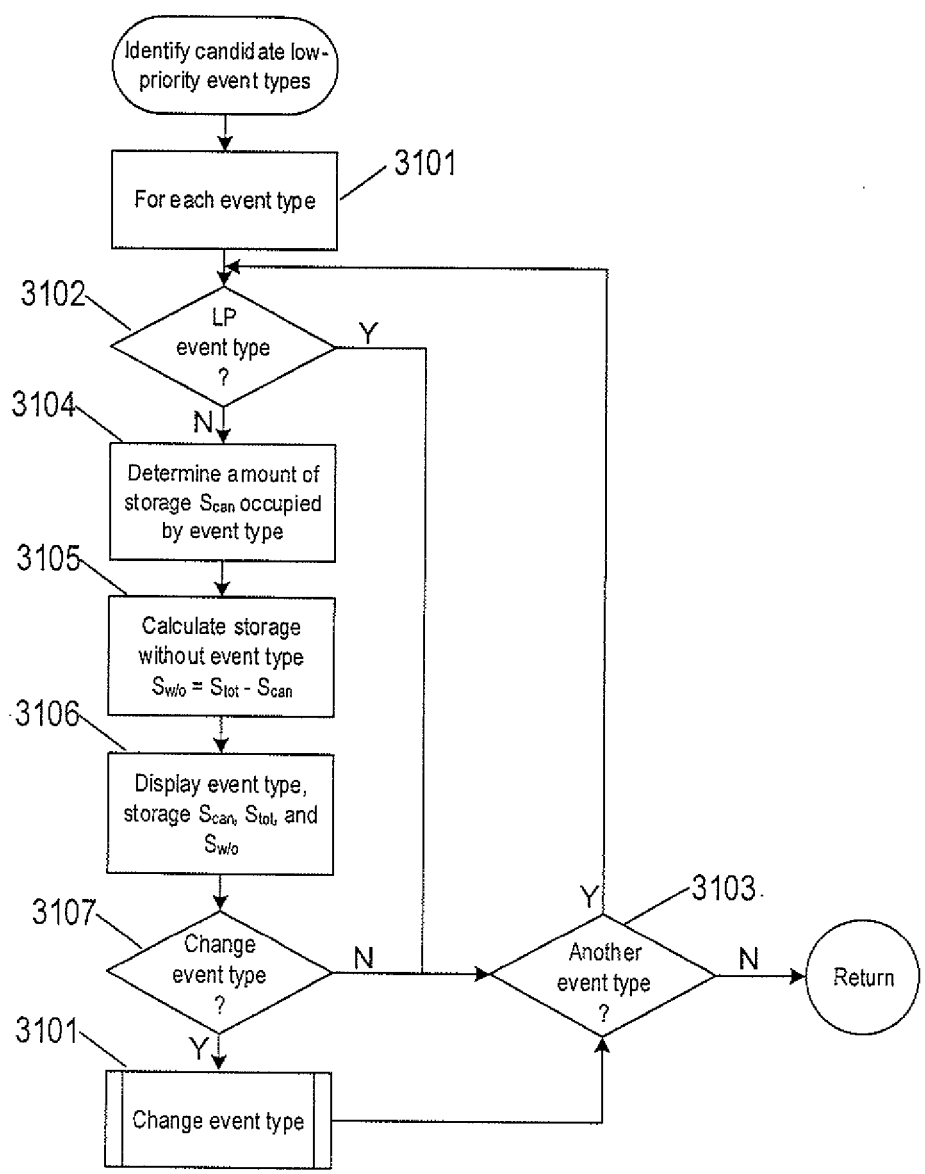
FIG. 31 shows a control-flow diagram of the method "identify candidate low-priority event types" called in FIG. 26.

FIG. 31 shows a control-flow diagram of the method "identify candidate low-priority event types" called in block 2605 of FIG. 26. A loop beginning with block 3101 repeats the operations of blocks 3102-3108 for each event type. In decision block 3102, when the event type is a low-priority event type, control flows to decision block 3103. Otherwise, control flows to decision block 3104. In block 3104, an amount of storage, $S_{can}$, occupied by the event messages of the event type is determined, as described above with reference to FIG. 23. In block 3105, obtain total storage for the event-log file, $S_{tot}$, and calculate what the amount storage of the event-log file would be without the event type $S_{w/o} = S_{tot} - S_{can}$. In block 3106, display the event type as a candidate low-priority event type the quantities Scan, Sw/0, and Stot, as described above with reference to FIG. 23. In decision block 3107, when a user has selected to change the status of the event type to low priority, control flows to block 3108. In block 3107, a method "change event type" is called to change the status of the event type to a low-priority event type.

Figure 32:
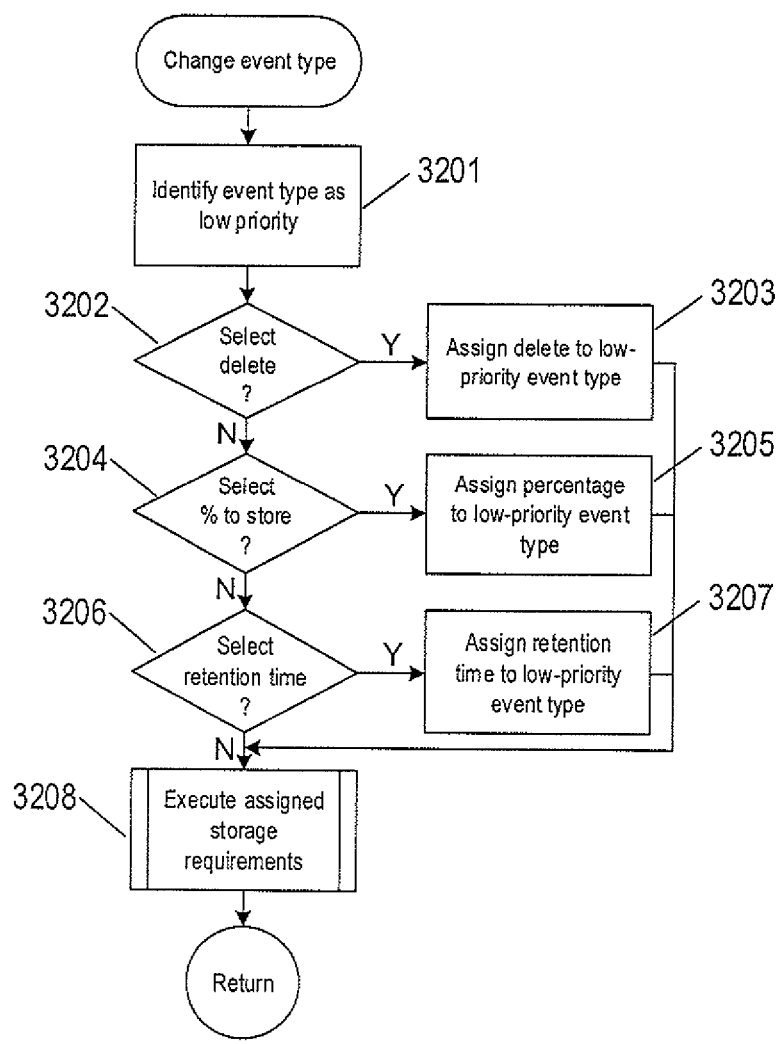
FIG. 32 shows a control-flow diagram of the method "change event type" called in FIG. 31.

FIG. 32 shows a control-flow diagram of the method "change event type" called in block 3110 of FIG. 31. In block 3201, the event type is identified a low-priority event type. In decision block 3202, control flows to block 3203 when the event type has been selected for deletion as described above with reference to FIG. 19. In block 3203, deletion is assigned to the event messages of the low-priority event type. In decision block 3204, control flows to block 3205 when a percentage of the event messages of the low-priority event type has been selected for storage as described above with reference to FIG. 20. In block 3205, the percentage is assigned to the event messages of the low-priority event type. In decision block 3206, control flows to block 3207 when a retention time has been assigned to the event messages of the low-priority event type as described above with reference to FIG. 21. In block 3207, a retention time is assigned to the event message of the event type. In block 3208, a method "execute assigned storage requirements" is called to execute the assignments of blocks 3203, 3205, and 3207.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method to identify and respond to low-priority event messages, the method comprising:
    identifying each event message of an event-log file as belonging to an event type;
    identifying certain event types as low-priority event types;

deleting the event messages of each low-priority event type in accordance with a storage requirement assigned to each low-priority event type;
identifying candidate low-priority event types of the event types that have not been previously identified as low-priority event types;
displaying storage space of the event messages of each low-priority event type occupy in one or more data-storage devices; and
displaying options for changing how each of the low-priority event type is stored in the one or more data-storage devices.

2. The method of claim 1, wherein identifying certain event types as low-priority event types comprises:
for each event type,
counting event messages of the event type over a time period to obtain a count of event messages of the event type;
counting user interactions with event messages of the event type over the time period to determine a number user interactions for the event type; and
identifying the event type as a low-priority event type and corresponding event messages as low priority when the count of event messages is less than or equal to a count threshold and the number of user interactions is greater than or equal to a number of interactions threshold.

3. The method of claim 1, wherein identifying certain event types as low-priority event types comprises identifying an event type as a low-priority event type and corresponding event messages as low priority, when a user identifies the event type as low priority.

4. The method of claim 1, wherein deleting the event messages of each low-priority event type in accordance with the storage requirement comprises:
identifying event messages of the low-priority event type for deletion, when the low-priority event type is selected for deletion; and
deleting the event message of the low-priority event type selected for deletion.

5. The method of claim 1, wherein deleting the event messages of each low-priority event type in accordance with the storage requirement comprises:
receiving a percentage of event messages to store in an event-log file;
for each event message,
generating a random number between zero and one;
storing the event message in an event-log file when the random number is less the percentage multiplied by one hundred; and
deleting the event message when the random number is greater than the percentage multiplied by one hundred.

6. The method of claim 1, wherein deleting the event messages of each low-priority event type in accordance with the storage requirement comprises:
receiving a retention time for storing the event message in an event-log file;
for each event message, deleting the event message form the event-log file when the difference between a current time stamp and a time stamp of the event message is greater than the retention time.

7. The method of claim 1, wherein identifying the candidate low-priority event types of the event types comprises:
calculating an amount of storage occupied by event messages of an event type;
determining total storage for an event-log file that stores event messages of the event type;
calculating storage of the event-log file without the event type as a different between the total storage of the event-log file and the amount of storage occupied by the event message;
displaying the event type as the candidate low-priority event type, the amount of storage occupied by event messages of the event type, the total storage for the event-log file that stores event messages of the event type, storage of the event-log file without the event type; and
changing status of the event type to a low-priority event type when a user selects an option to change the status of the event type.

8. A system to identify and respond to low-priority event messages, the system comprising:
one or more processors;
one or more data-storage devices; and
machine-readable instructions stored in the one or more data-storage devices that when executed using the one or more processors controls the system to carry out
identifying each event message of an event-log file as belonging to an event type;
identifying certain event types as low-priority event types;
deleting the event messages of each low-priority event type in accordance with a storage requirement assigned to each low-priority event type;
identifying candidate low-priority event types of the event types that have not been previously identified as low-priority event types;
displaying storage space of the event messages of each low-priority event type occupy in one or more data-storage devices; and
displaying options for changing how each of the low-priority event type is stored in the one or more data-storage devices.

9. The system of claim 1, wherein identifying certain event types as low-priority event types comprises:
for each event type,
counting event messages of the event type over a time period to obtain a count of event messages of the event type;
counting user interactions with event messages of the event type over the time period to determine a number user interactions for the event type; and
identifying the event type as a low-priority event type and corresponding event messages as low priority when the count of event messages is less than or equal to a count threshold and the number of user interactions is greater than or equal to a number of interactions threshold.

10. The system of claim 1, wherein identifying certain event types as low-priority event types comprises identifying an event type as a low-priority event type and corresponding event messages as low priority, when a user identifies the event type as low priority.

11. The system of claim 1, wherein deleting the event messages of each low-priority event type in accordance with the storage requirement comprises:
identifying event messages of the low-priority event type for deletion, when the low-priority event type is selected for deletion; and
deleting the event message of the low-priority event type selected for deletion.

12. The system of claim 1, wherein deleting the event messages of each low-priority event type in accordance with the storage requirement comprises:
- receiving a percentage of event messages to store in an event-log file;
- for each event message,
  - generating a random number between zero and one;
  - storing the event message in an event-log file when the random number is less the percentage multiplied by one hundred; and
  - deleting the event message when the random number is greater than the percentage multiplied by one hundred.

13. The system of claim 1, wherein deleting the event messages of each low-priority event type in accordance with the storage requirement comprises:
- receiving a retention time for storing the event message in an event-log file;
- for each event message, deleting the event message form the event-log file when the difference between a current time stamp and a time stamp of the event message is greater than the retention time.

14. The system of claim 1, wherein identifying the candidate low-priority event types of the event types comprises:
- calculating an amount of storage occupied by event messages of an event type;
- determining total storage for an event-log file that stores event messages of the event type;
- calculating storage of the event-log file without the event type as a different between the total storage of the event-log file and the amount of storage occupied by the event message;
- displaying the event type as the candidate low-priority event type, the amount of storage occupied by event messages of the event type, the total storage for the event-log file that stores event messages of the event type, storage of the event-log file without the event type; and
- changing status of the event type to a low-priority event type when a user selects an option to change the status of the event type.

15. A non-transitory computer-readable medium encoded with machine-readable instructions that implement a method carried out by one or more processors of a computer system to perform the operations of
- identifying each event message of an event-log file as belonging to an event type;
- identifying certain event types as low-priority event types;
- deleting the event messages of each low-priority event type in accordance with a storage requirement assigned to each low-priority event type;
- identifying candidate low-priority event types of the event types that have not been previously identified as low-priority event types;
- displaying storage space of the event messages of each low-priority event type occupy in one or more data-storage devices; and
- displaying options for changing how each of the low-priority event type is stored in the one or more data-storage devices.

16. The medium of claim 15, wherein identifying certain event types as low-priority event types comprises:
- for each event type,
  - counting event messages of the event type over a time period to obtain a count of event messages of the event type;
  - counting user interactions with event messages of the event type over the time period to determine a number user interactions for the event type; and
  - identifying the event type as a low-priority event type and corresponding event messages as low priority when the count of event messages is less than or equal to a count threshold and the number of user interactions is greater than or equal to a number of interactions threshold.

17. The medium of claim 15, wherein identifying certain event types as low-priority event types comprises identifying an event type as a low-priority event type and corresponding event messages as low priority, when a user identifies the event type as low priority.

18. The medium of claim 15, wherein deleting the event messages of each low-priority event type in accordance with the storage requirement comprises:
- identifying event messages of the low-priority event type for deletion, when the low-priority event type is selected for deletion; and
- deleting the event message of the low-priority event type selected for deletion.

19. The medium of claim 15, wherein deleting the event messages of each low-priority event type in accordance with the storage requirement comprises:
- receiving a percentage of event messages to store in an event-log file;
- for each event message,
  - generating a random number between zero and one;
  - storing the event message in an event-log file when the random number is less the percentage multiplied by one hundred; and
  - deleting the event message when the random number is greater than the percentage multiplied by one hundred.

20. The medium of claim 15, wherein deleting the event messages of each low-priority event type in accordance with the storage requirement comprises:
- receiving a retention time for storing the event message in an event-log file;
- for each event message, deleting the event message form the event-log file when the difference between a current time stamp and a time stamp of the event message is greater than the retention time.

21. The medium of claim 15, wherein identifying the candidate low-priority event types of the event types comprises:
- calculating an amount of storage occupied by event messages of an event type;
- determining total storage for an event-log file that stores event messages of the event type;
- calculating storage of the event-log file without the event type as a different between the total storage of the event-log file and the amount of storage occupied by the event message;
- displaying the event type as the candidate low-priority event type, the amount of storage occupied by event messages of the event type, the total storage for the event-log file that stores event messages of the event type, storage of the event-log file without the event type; and
- changing status of the event type to a low-priority event type when a user selects an option to change the status of the event type.

* * * * *